US009054846B2

(12) United States Patent
Falahati et al.

(10) Patent No.: US 9,054,846 B2
(45) Date of Patent: Jun. 9, 2015

(54) POWER CONTROL FOR SIMULTANEOUS TRANSMISSION OF ACK/NACK AND CHANNEL-STATE INFORMATION IN CARRIER AGGREGATION SYSTEMS

(71) Applicant: Telefonaktiebolaget LM Ericsson (publ), Stockholm (SE)

(72) Inventors: Sorour Falahati, Stockholm (SE); Robert Baldemair, Solna (SE); Jung-Fu Cheng, Fremont, CA (US); Mattias Frenne, Uppsala (SE); Daniel Larsson, Vallentuna (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 112 days.

(21) Appl. No.: 13/814,953

(22) PCT Filed: Jan. 10, 2013

(86) PCT No.: PCT/SE2013/050011
§ 371 (c)(1),
(2) Date: Feb. 8, 2013

(87) PCT Pub. No.: WO2014/021753
PCT Pub. Date: Feb. 6, 2014

(65) Prior Publication Data
US 2014/0078974 A1    Mar. 20, 2014

Related U.S. Application Data

(60) Provisional application No. 61/677,645, filed on Jul. 31, 2012.

(51) Int. Cl.
*H04L 5/00* (2006.01)
*H04W 52/36* (2009.01)
(Continued)

(52) U.S. Cl.
CPC ........... *H04L 5/0055* (2013.01); *H04W 52/146* (2013.01); *H04W 52/325* (2013.01); *H04W 52/365* (2013.01); *H04W 52/48* (2013.01)

(58) Field of Classification Search
CPC ...... H04W 72/04; H04W 48/16; H04W 84/12
USPC .......................................... 370/329, 328, 338
See application file for complete search history.

(56) References Cited

U.S. PATENT DOCUMENTS 7,996,032 B2 * 8/2011 Malladi et al. ............... 455/522
2011/0141928 A1 * 6/2011 Shin et al. ..................... 370/252
(Continued)

FOREIGN PATENT DOCUMENTS

CN    102045827 A    5/2011
WO    2011046486 A1    4/2011
WO    2012063138 A1    5/2012

OTHER PUBLICATIONS

Unknown, Author. "HARO-ACK and Periodic CSI Multiplexing." Samsung. 3GPP TSG RAN WG1 #69. R1-122213. Prague, Czech Republic, May 21-25, 2012. 1-3.

(Continued)

*Primary Examiner* — Mohammad Anwar
(74) *Attorney, Agent, or Firm* — Murphy, Bilak & Homiller, PLLC

(57) ABSTRACT

Channel-state information and hybrid-ARQ ACK/NACK information for multiple carriers are simultaneously transmitted using a PUCCH Format 3 structure, where the hybrid-ARQ ACK/NACK bits and CSI bits are separately encoded and interleaved. In an example method, a power control offset parameter is calculated (2110) as a linear combination of at least a number N, representing a number of channel-state information bits and a number M, representing a number of hybrid-ARQ ACK/NACK bits. The method continues with the calculating (2120) of a power level for a transmission on a physical uplink control channel (PUCCH), using the power control offset parameter. In some embodiments, encoded channel-state information and hybrid-ARQ ACK/NACK bits are then transmitted (2060) according to the calculated power level. In some embodiments, the linear combination is of the form aN+bM+c, where a, b, and c are non-zero constants.

10 Claims, 21 Drawing Sheets

(51) Int. Cl.
  *H04W 52/14* (2009.01)
  *H04W 52/32* (2009.01)
  *H04W 52/48* (2009.01)

(56) References Cited

U.S. PATENT DOCUMENTS

2012/0082157 A1    4/2012  Yamada et al.
2012/0275425 A1*  11/2012  Li et al. .................... 370/329

OTHER PUBLICATIONS

Unknown, Author. "Multi cell AN and single cell P-CSI multiplexing with PUCCH F3." Samsung. 3GPP TSG-RAN WG1 Meeting #69. R1-122543. Prague, Czech Republic, May 21-25, 2012. 1-4.

Unknown, Author. "Power control for Periodic CSI and Multi-cell HARQ-ACK Multiplexing for PUCCH format 3." Ericsson, ST-Ericsson. 3GPP TSG-RAN WG1 #70bis. R1•124142. San Diego, USA. Oct. 8-12, 2012. 1-4.

3GPP. "3rd Generation Partnership Project; Technical Specification Group Radio Access Network; Evolved Universal Terrestrial Radio Access (E-UTRA); Physical layer procedures (Release 11)." 3GPP TS 36.213 V11.1.0. Dec. 2012. 1-160.

3GPP. "3rd Generation Partnership Project; Technical Specification Group Radio Access Network; Evolved Universal Terrestrial Radio Access (E-UTRA); Physical layer procedures (Release 10)." 3GPP TS 36.213 V10.4.0. Dec. 2011. 1-125.

3rd Generation Partnership Project. 3GPP TS 36.211 V10.5.0 (Jun. 2012). 3rd Generation Partnership Project; Technical Specification Group Radio Access Network; Evolved Universal Terrestrial Radio Access (E-UTRA); Physical Channels and Modulation (Release 10). Jun. 2012.

3rd Generation Partnership Project. 3GPP TS 36.213 V10.5.0 (Mar. 2012). 3rd Generation Partnership Project; Technical Specification Group Radio Access Network; Evolved Universal Terrestrial Radio Access (E-UTRA); Physical layer procedures (Release 10). Mar. 2012.

3rd Generation Partnership Project. "Multi-cell HARQ-ACK and Periodic CSI." 3GPP TSG-RAN WG1 #69, R1-121987, May 21-25, 2012, Prague, Czech Republic.

Unknown, Author, "Defining Delta_F PUCCH for format 2a/2b", Ericsson, TSG-RAN WG1 #54, R1-083370, Jeju, South Korea, Aug. 18-22, 2008, 1-3.

* cited by examiner

POWER CONTROL FOR SIMULTANEOUS TRANSMISSION OF ACK/NACK AND CHANNEL-STATE INFORMATION IN CARRIER AGGREGATION SYSTEMS

RELATED APPLICATION

This application claims the benefit of and priority to U.S. Provisional Application Ser. No. 61/677,645, filed 31 Jul. 2012. The entire contents of said U.S. Provisional Application are incorporated herein by reference

TECHNICAL FIELD

The present application is generally related to power control of transmissions in wireless communications systems and is more specifically related to power control as applied to the transmission of Automatic Repeat Request (ARQ) bits and channel-state information (CSI) bits in systems employing carrier aggregation techniques.

BACKGROUND

Carrier aggregation is one of the new features recently developed by the members of the 3rd-Generation Partnership Project (3GPP) for so-called Long Term Evolution (LTE) systems, and is standardized as part of LTE Release 10, which is also known as LTE-Advanced. An earlier version of the LTE standards, LTE Release 8, supports bandwidths up to 20 MHz. However, the very high data rates contemplated for LTE-Advanced will require an expansion of the transmission bandwidth. Accordingly, bandwidths up to 100 MHz are supported in LTE-Advanced. In order to maintain backward compatibility with LTE Release 8 mobile terminals, the available spectrum is divided into Release 8-compatible chunks called component carriers. Carrier aggregation enables bandwidth expansion beyond the limits of LTE Release 8 systems by allowing mobile terminals to transmit and receive data over multiple component carriers, which together can cover up to 100 MHz of spectrum. Importantly, the carrier aggregation approach ensures compatibility with earlier Release 8 mobile terminals, while also ensuring efficient use of a wide carrier by making it possible for legacy mobile terminals to be scheduled in all parts of the wideband LTE-Advanced carrier.

The number of aggregated component carriers, as well as the bandwidth of the individual component carrier, may be different for uplink (UL) and downlink (DL) transmissions. A carrier configuration is referred to as "symmetric" when the number of component carriers in each of the downlink and the uplink are the same. In an asymmetric configuration, on the other hand, the number of component carriers differs between the downlink and uplink. Further, the number of component carriers configured for a geographic cell area may be different from the number of component carriers seen by a given mobile terminal. A mobile terminal, for example, may support more downlink component carriers than uplink component carriers, even though the same number of uplink and downlink component carriers may be offered by the network in a particular area.

LTE systems can operate in either Frequency-Division Duplex (FDD) mode or Time-Division Duplex (TDD) mode. In FDD mode, downlink and uplink transmissions take place in different, sufficiently separated, frequency bands. In TDD mode, on the other hand, downlink and uplink transmission take place in different, non-overlapping time slots. Thus, TDD can operate in unpaired spectrum, whereas FDD requires paired spectrum. TDD mode also allows for different asymmetries in terms of the amount of resources allocated for uplink and downlink transmission, respectively, by means of different downlink/uplink configurations. These differing configurations permit the shared frequency resources to be allocated to downlink and uplink use in differing proportions. Accordingly, uplink and downlink resources can be allocated asymmetrically for a given TDD carrier.

One consideration for carrier aggregation is how to transmit control signaling from the mobile terminal on the uplink to the wireless network. Uplink control signaling may include acknowledgement (ACK) and negative-acknowledgement (NACK) signaling for hybrid automatic repeat request (Hybrid ARQ, or HARQ) protocols, channel state information (CSI) and channel quality information (CQI) reporting for downlink scheduling, and scheduling requests (SRs) indicating that the mobile terminal needs uplink resources for uplink data transmissions. In LTE systems that use carrier aggregation, a single uplink carrier is used by a mobile terminal to carry ACK/NACK and channel-state information for several downlink carriers. Further, in LTE systems that use TDD, ACK/NACK information for several downlink subframes may need to be transmitted in a single uplink subframe. In systems that use both TDD and carrier aggregation, a relatively large number of ACK/NACK bits and CSI bits may need to be transmitted in a single uplink subframe, on a single uplink carrier. Accordingly, improved techniques are needed for managing the transmission of uplink control-channel information in systems that employ carrier aggregation and/or TDD.

SUMMARY

Channel-state information and hybrid-ARQ ACK/NACK information for multiple carriers may be simultaneously transmitted, using a PUCCH Format 3 structure. Embodiments of the techniques disclosed herein include methods for simultaneous reporting of channel-state information bits and hybrid-ARQ ACK/NACK bits for multiple downlink subframes or multiple downlink carriers, or both. An example method begins with calculating a power control offset parameter as a linear combination of at least a number N, representing a number of channel-state information bits and a number M, representing a number of hybrid-ARQ ACK/NACK bits. The method continues with the calculating of a power level for a transmission on a physical uplink control channel (PUCCH), using the power control offset parameter.

In some embodiments, encoded channel-state information and hybrid-ARQ ACK/NACK bits are then transmitted according to the calculated power level. In some embodiments, the linear combination is of the form aN+bM+c, where a, b, and c are non-zero constants.

In some of these and in other embodiments, the method further includes the calculating of a power headroom parameter, based on the calculated power level and based on a calculated power level for shared channel transmission. The power headroom parameter may then be transmitted to a base station.

Several of the methods summarized above may be implemented using electronic data processing circuitry provided in a mobile terminal. Each mobile terminal, of course, also includes suitable radio circuitry for receiving and transmitting radio signals formatted in accordance with known formats and protocols, e.g., LTE formats and protocols. Accordingly, mobile terminal apparatus adapted to carry out any of these techniques are described in detail in the discussion that follows.

Of course, the disclosed techniques are not limited to the above-summarized features and advantages. Indeed, those skilled in the art will recognize additional features and advantages upon reading the following detailed description, and upon viewing the accompanying drawings.

DETAILED DESCRIPTION

In the discussion that follows, specific details of particular embodiments of the presently disclosed techniques are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not obscure the description with unnecessary detail. Those skilled in the art will appreciate that the functions described may be implemented in one or in several nodes. Some or all of the functions described may be implemented using hardware circuitry, such as analog and/or discrete logic gates interconnected to perform a specialized function, ASICs, PLAs, etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Figure 1:
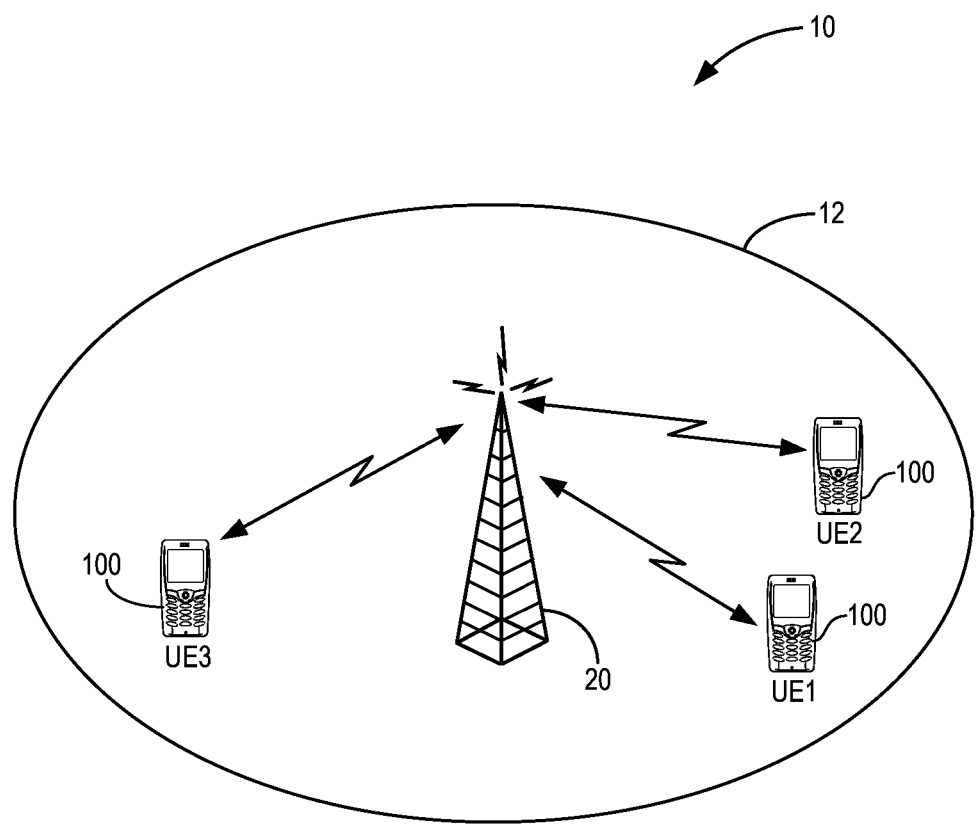
FIG. 1 illustrates an example of a mobile communication system.

Referring now to the drawings, FIG. 1 illustrates an exemplary mobile communication network 10 for providing wireless communication services to mobile terminals 100. Three mobile terminals 100, which are referred to as "user equipment" or "UE" in LTE terminology, are shown in FIG. 1. The mobile terminals 100 may comprise, for example, cellular telephones, personal digital assistants, smart phones, laptop computers, handheld computers, or other devices with wireless communication capabilities. It should be noted that the term "mobile terminal," as used herein, refers to a terminal operating in a mobile communication network and does not necessarily imply that the terminal itself is mobile or moveable. Thus, the term may refer to terminals that are installed in fixed configurations, such as in certain machine-to-machine applications, as well as to portable devices, devices installed in motor vehicles, etc.

The mobile communication network 10 comprises a plurality of geographic cell areas or sectors 12. Each geographic cell area or sector 12 is served by a base station 20, which is referred to in LTE as a NodeB or Evolved NodeB (eNodeB). One base station 20 may provide service in multiple geographic cell areas or sectors 12. The mobile terminals 100 receive signals from base station 20 on one or more downlink (DL) channels, and transmit signals to the base station 20 on one or more uplink (UL) channels.

For illustrative purposes, several embodiments will be described in the context of a Long-Term Evolution (LTE) system. Those skilled in the art will appreciate, however, that several embodiments of the disclosed techniques may be more generally applicable to other wireless communication systems, including, for example, WiMax (IEEE 802.16) systems.

Figure 2:
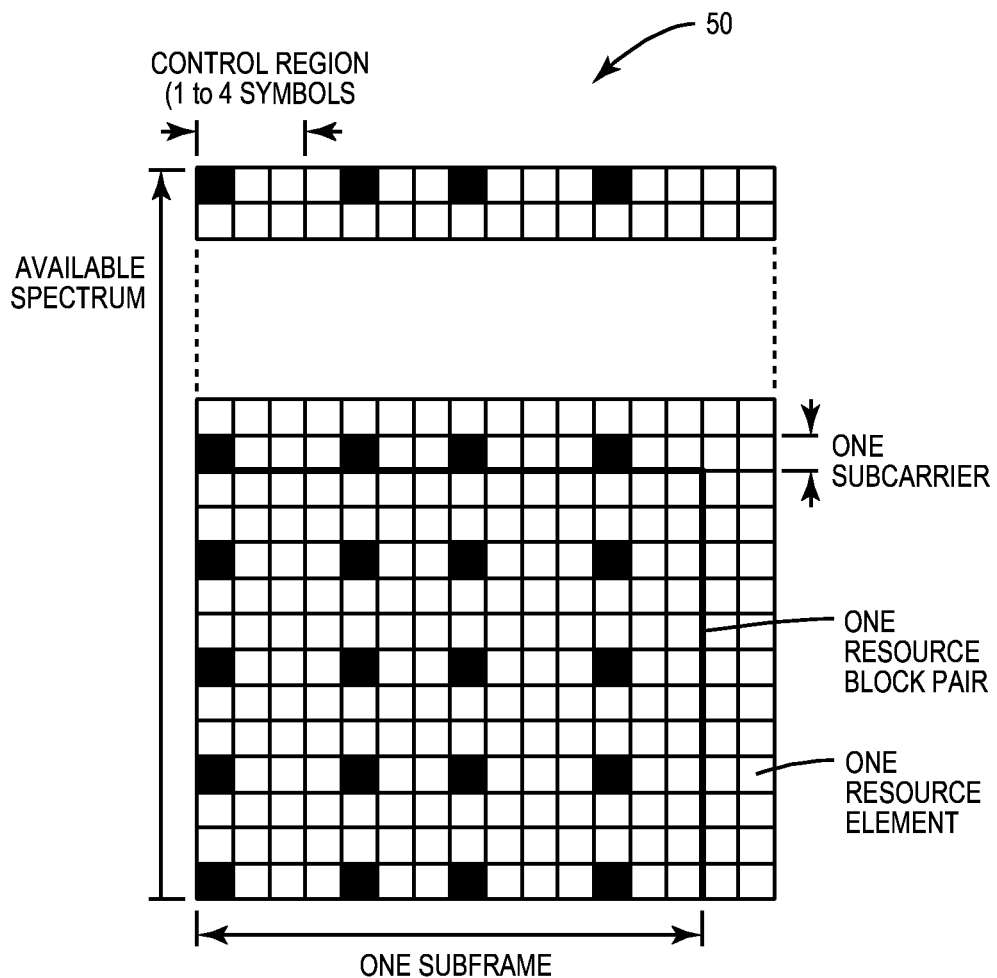
FIG. 2 illustrates a grid of time-frequency resources for a mobile communication system that uses OFDM.

LTE uses Orthogonal Frequency Division Multiplexing (OFDM) in the downlink and Discrete Fourier Transform (DFT)-spread OFDM in the uplink. The basic LTE downlink physical resource can be viewed as a time-frequency grid. FIG. 2 illustrates a portion of the available spectrum of an exemplary OFDM time-frequency grid 50 for LTE. Generally speaking, the time-frequency grid 50 is divided into one millisecond subframes. Each subframe includes a number of OFDM symbols. For a normal cyclic prefix (CP) length, suitable for use in situations where multipath dispersion is not expected to be extremely severe, a subframe consists of fourteen OFDM symbols. A subframe has only twelve OFDM symbols if an extended cyclic prefix is used. In the frequency domain, the physical resources are divided into adjacent subcarriers with a spacing of 15 kHz. The number of subcarriers varies according to the allocated system bandwidth. The smallest element of the time-frequency grid 50 is a resource element. A resource element consists of one OFDM subcarrier during one OFDM symbol interval.

Resource elements are grouped into resource blocks, where each resource block in turn consists of twelve OFDM subcarriers, within one of two equal-length slots of a subframe. FIG. 2 illustrates a resource block pair, comprising a total of 168 resource elements.

Downlink transmissions are dynamically scheduled, in that in each subframe the base station transmits control information identifying the mobile terminals to which data is transmitted and the resource blocks in which that data is transmitted, for the current downlink subframe. This control signaling is typically transmitted in a control region, which occupies the first one, two, three, or four OFDM symbols in each subframe. A downlink system with a control region of three OFDM symbols is illustrated in FIG. 2. The dynamic scheduling information is communicated to the UEs ("user equipment," 3GPP terminology for a mobile station) via a Physical Downlink Control Channel (PDCCH) transmitted in the control region. After successful decoding of a PDCCH, the UE performs reception of traffic data from the Physical Downlink Shared Channel (PDSCH) or transmission of traffic data on the Physical Uplink Shared Channel (PUSCH), according to pre-determined timing specified in the LTE specifications.

Figure 3:
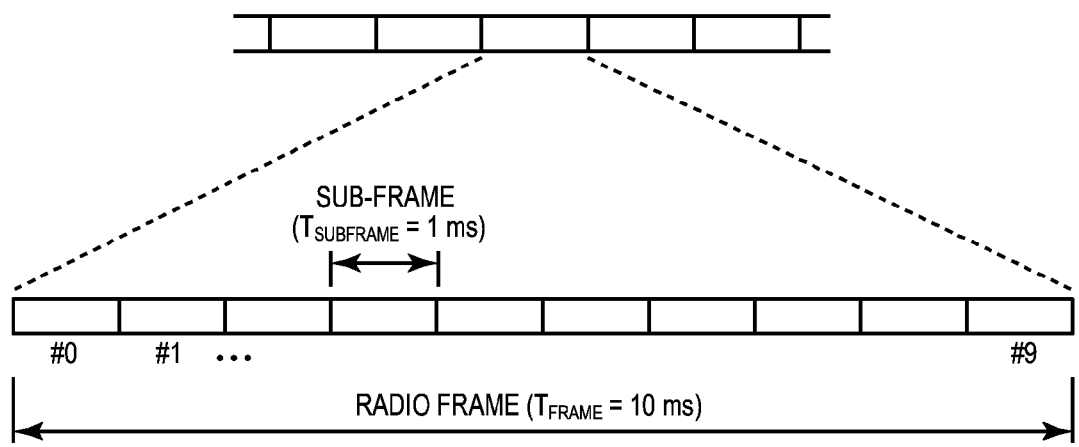
FIG. 3 illustrates the time-domain structure of an LTE signal.

As shown in FIG. 3, LTE downlink transmissions are further organized into radio frames of 10 milliseconds, in the time domain, each radio frame consisting of ten subframes. Each subframe can further be divided into two slots of 0.5 milliseconds duration. Furthermore, resource allocations in LTE are often described in terms of resource blocks, where a resource block corresponds to one slot (0.5 ms) in the time domain and twelve contiguous subcarriers in the frequency domain. Resource blocks are numbered in the frequency domain, starting with 0 from one end of the system bandwidth.

For error control, LTE uses hybrid-ARQ (HARQ), where, after receiving downlink data in a subframe, the mobile terminal attempts to decode it and reports to the base station whether the decoding was successful (ACK) or not (NACK) via a Physical Uplink Control Channel (PUCCH). In the event of an unsuccessful decoding attempt, the base station (evolved NodeB, or eNodeB, in 3GPP terminology) can retransmit the erroneous data. Similarly, the base station can indicate to the UE whether the decoding of the PUSCH was successful (ACK) or not (NACK) via the Physical Hybrid ARQ Indicator CHannel (PHICH).

In addition to the hybrid-ARQ ACK/NACK information transmitted from the mobile terminal to the base station, uplink control signaling from the mobile terminal to the base station also includes reports related to the downlink channel conditions, referred to generally as channel-state information (CSI) or channel-quality information (CQI). This CSI/CQI is used by the base station to assist in downlink resource scheduling decisions. Because LTE systems rely on dynamic scheduling of both downlink and uplink resources, uplink control-channel information also includes scheduling requests, which the mobile terminal sends to indicate that it needs uplink traffic-channel resources for uplink data transmissions.

In scenarios without downlink carrier aggregation, when a UE has data to transmit on PUSCH, it multiplexes the uplink control information with data on PUSCH. Thus, a UE only uses PUCCH for signaling this uplink control information when it does not have any data to transmit on PUSCH. Accordingly, if the mobile terminal has not been assigned an uplink resource for data transmission, Layer 1/Layer 2 (L1/L2) control information, including channel-status reports, hybrid-ARQ acknowledgments, and scheduling requests, is transmitted in uplink resources (resource blocks) specifically assigned for uplink L1/L2 control on the Physical Uplink Control CHannel (PUCCH), which was first defined in Release 8 of the 3GPP specifications (LTE Rel-8).

Figure 4:
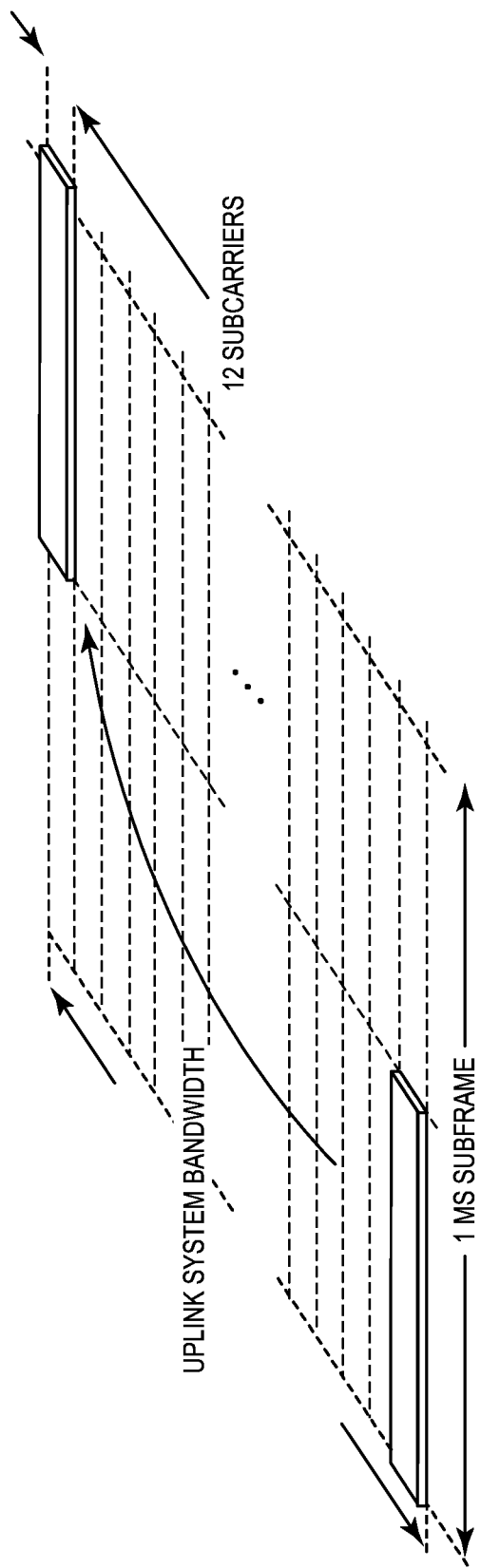
FIG. 4 illustrates the positioning of PUCCH resources in an uplink subframe according to Release 8 standards for LTE.

As illustrated in FIG. 4, these resources are located at the edges of the uplink cell bandwidth that is available to the mobile terminal for use. Each physical control channel resource is made up of a pair of resource blocks, where each resource block in turn consists of twelve OFDM subcarriers, within one of the two slots of the uplink subframe. In order to provide frequency diversity, the physical control channel resources are frequency hopped on the slot boundary—thus, the first resource block of the pair is at the lower part of the spectrum within the first slot of the subframe while the second resource block of the pair is positioned at the upper part of the spectrum during the second slot of the subframe (or vice-versa). If more resources are needed for the uplink L1/L2 control signaling, such as in case of very large overall transmission bandwidth supporting a large number of users, additional resource blocks can be assigned, adjacent to the previously assigned resource blocks.

The reasons for locating the PUCCH resources at the edges of the overall available spectrum are two-fold. First, together with the frequency hopping described above, this maximizes the frequency diversity experienced by the control signaling, which can be encoded so that it is spread across both resource blocks. Second, assigning uplink resources for the PUCCH at other positions within the spectrum, i.e., not at the edges, would fragment the uplink spectrum, making it difficult to assign very wide transmission bandwidths to a single mobile terminal while still retaining the single-carrier property of the uplink transmission.

In LTE systems using TDD, hybrid-ARQ ACK/NACK feedback carried by a single uplink subframe may correspond to several downlink subframes. The timings for HARQ A/N feedbacks for the PDSCH are specified with extensive tables and procedure descriptions for each U/D configurations in the 3GPP specification, "Physical Channels and Modulation," 3GPP TS 36.211, v. 10.50.0 (June 2012), available at www.3gpp.org. According to the Release 8 specifications of LTE, the UE shall feed back ACK/NACK information corresponding to decoded PDSCH transmissions in pre-defined uplink subframes. The UE shall transmit such hybrid-ARQ ACK/NACK response on the PUCCH in uplink subframe n if there is a PDSCH transmission indicated by the detection of a corresponding PDCCH or if there is PDCCH indicating downlink SPS release within subframe(s) n−k, where k is within an association set $K=\{k_0, k_1, \ldots, k_{M-1}\}$, listed in Table 1.

The size of the association set K is denoted by M. The parameter M is used in the following to determine the PUCCH resources and signaling. The parameter M may take on different values in different subframes and in cells having different UL/downlink configurations. Note that, since the UL/downlink configurations of the aggregated cells must be identical in Rel-10 TDD carrier aggregation, the parameters M for a subframe are identical across all configured serving cells for a UE.

TABLE 1

Downlink association set index K = {k₀, k₁, . . . , $k_{M-1}$} for TDD

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | | | 6 | | 4 | | | 6 | | 4 |
| 1 | | | 7, 6 | 4 | | | | 7, 6 | 4 | |
| 2 | | | 8, 7, 4, 6 | | | | | 8, 7, 4, 6 | | |
| 3 | | | 7, 6, 11 | 6, 5 | 5, 4 | | | | | |
| 4 | | | 12, 8, 7, 11 | 6, 5, 4, 7 | | | | | | |
| 5 | | | 13, 12, 9, 8, 7, 5, 4, 11, 6 | | | | | | | |
| 6 | | | 7 | 7 | 5 | | | 7 | 7 | |

Figure 5:
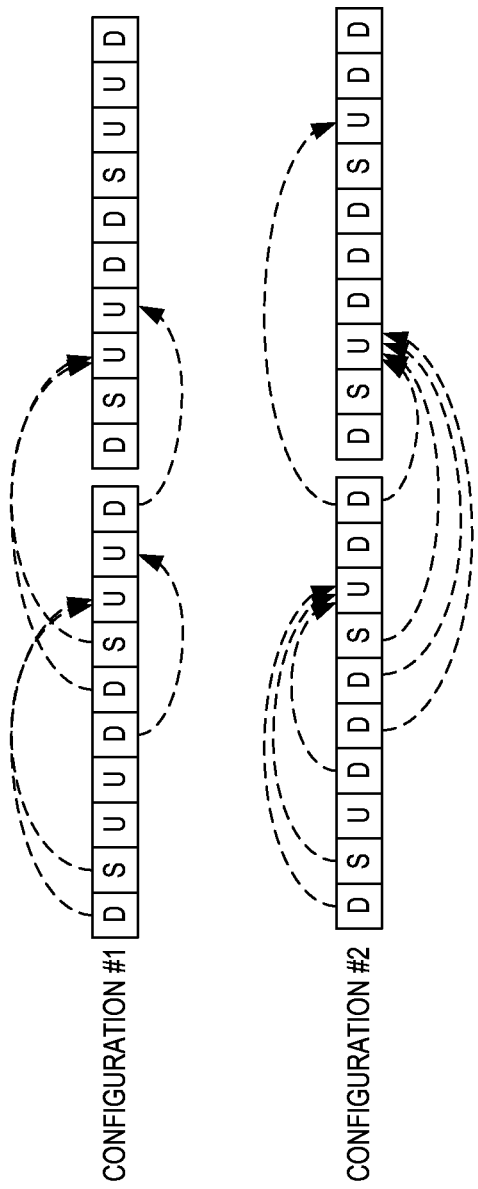
FIG. 5 illustrates the mapping of ACK/NACK bits to uplink subframes in a TDD frame.

Examples to illustrate the timing relationships specified in Table 1 are illustrated in FIG. 5. For uplink subframe 7 in a configuration 1 cell, Table 1 provides the association set K={7, 6}, which corresponds to carrying possible HARQ A/N feedbacks for PDSCHs transmitted in subframes 7−7=0 and 7−6=1. In FIG. 5, this is illustrated as arrows from downlink subframes 0 and 1 to the uplink subframe 7, in the portion of the figure labeled "Configuration #1." The parameter M=2 for this downlink subframe 7 in the configuration 1 cell.

Similarly, for uplink subframe 2 in the configuration 2 cell, Table 1 provides the association set K={8, 7, 4, 6}, which corresponds to carrying possible HARQ A/N feedbacks for PDSCHs transmitted in subframes 4, 5, 6, and 8 of the preceding frame. This is illustrated as arrows from these downlink subframes to the uplink subframe 2 in FIG. 5, Configuration #2. The parameter M=4 for this uplink subframe 2 in the configuration 2 cell.

Further, the number of subframes scheduled by the eNodeB can be indicated to the UE by utilizing 2 bits in the DCI format that indicate the so called Downlink assignment index. The 2 bits represent the values according to Table 2. The DAI is used by the UE to detect whether it has missed a downlink assignment, for example.

TABLE 2

Downlink assignment Index

| DAI MSB, LSB | $V_{DAI}^{UL}$ or $V_{DAI}^{DL}$ | Number of subframes with PDSCH transmission and with PDCCH indicating downlink SPS release |
|---|---|---|
| 0, 0 | 1 | 1 or 5 or 9 |
| 0, 1 | 2 | 2 or 6 |
| 1, 0 | 3 | 3 or 7 |
| 1, 1 | 4 | 0 or 4 or 8 |

When a UE has ACK/NACK to send in response to a downlink PDSCH transmission, it determines which PUCCH resource to use from the PDCCH transmission that assigned the PDSCH resources to the UE. More specifically, an index to the PUCCH resource for the UE is derived from the number of the first control channel element used to transmit the downlink resource assignment. When a UE has a scheduling request or CQI to send, it uses a specific PUCCH resource that has been pre-configured for the UE by higher layer signaling.

Depending on the different types of information that PUCCH is to carry, several different PUCCH formats may be used. The data-carrying capacity of a pair of resource blocks during one subframe is more than is generally needed for the short-term control signaling needs of one mobile terminal. Therefore, to efficiently exploit the resources set aside for control signaling, multiple mobile terminals can share the same physical control channel resource. This is done by assigning each of several mobile terminals different orthogonal phase-rotations of a cell-specific, length-12, frequency-domain sequence and/or different orthogonal time-domain cover codes. By applying these frequency-domain rotations and/or time-domain covering codes to the encoded control channel data, as many as 36 mobile terminals can share a given physical control channel resource in some circumstances.

Several different encoding formats have been developed by 3GPP to encode different quantities and types of uplink control channel data, within the constraints of a single physical control channel resource. These several formats, known generally as PUCCH Format 1, PUCCH Format 2, and PUCCH Format 3, are described in detail at pages 226-242 of the text "4G LTE/LTE-Advanced for Mobile Broadband," by Erik Dahlman, Stefan Parkvall, and Johan Sköld (Academic Press, Oxford UK, 2011), and are summarized briefly below.

PUCCH formats 1, 1a, and 1b, which are used to transmit scheduling requests and/or ACK/NACK, are based on cyclic shifts of a Zadoff-Chu sequence. A modulated data symbol is multiplied with the cyclically Zadoff-Chu shifted sequence. The cyclic shift varies from one symbol to another and from one slot to the next. Although twelve different shifts are available, higher-layer signaling may configure UEs in a given cell to use fewer than all of the shifts, to maintain orthogonality between PUCCH transmissions in cells that exhibit high frequency selectivity. After the modulated data symbol is multiplied with the Zadoff-Chu sequence, the result is spread using an orthogonal spreading sequence. PUCCH formats 1, 1a, and 1b carry three reference symbols per slot (when normal cyclic prefix is used), at SC-FDMA symbol numbers 2, 3, and 4.

PUCCH Formats 1a and 1b refer to PUCCH transmissions that carry either one or two hybrid-ARQ acknowledgements, respectively. A PUCCH Format 1 transmission (carrying only a SR) is transmitted on a UE-specific physical control channel resource (defined by a particular time-frequency resource, a cyclic-shift, and an orthogonal spreading code) that has been pre-configured by RRC signaling. Likewise, PUCCH Format 1a or 1b transmissions carrying only hybrid-ARQ acknowledgements are transmitted on a different UE-specific physical control channel resource. PUCCH Format 1a or 1b transmissions that are intended to carry both ACK/NACK information and a scheduling request are transmitted on the assigned SR resource for positive SR transmission, and are encoded with the ACK/NACK information.

Figure 6:
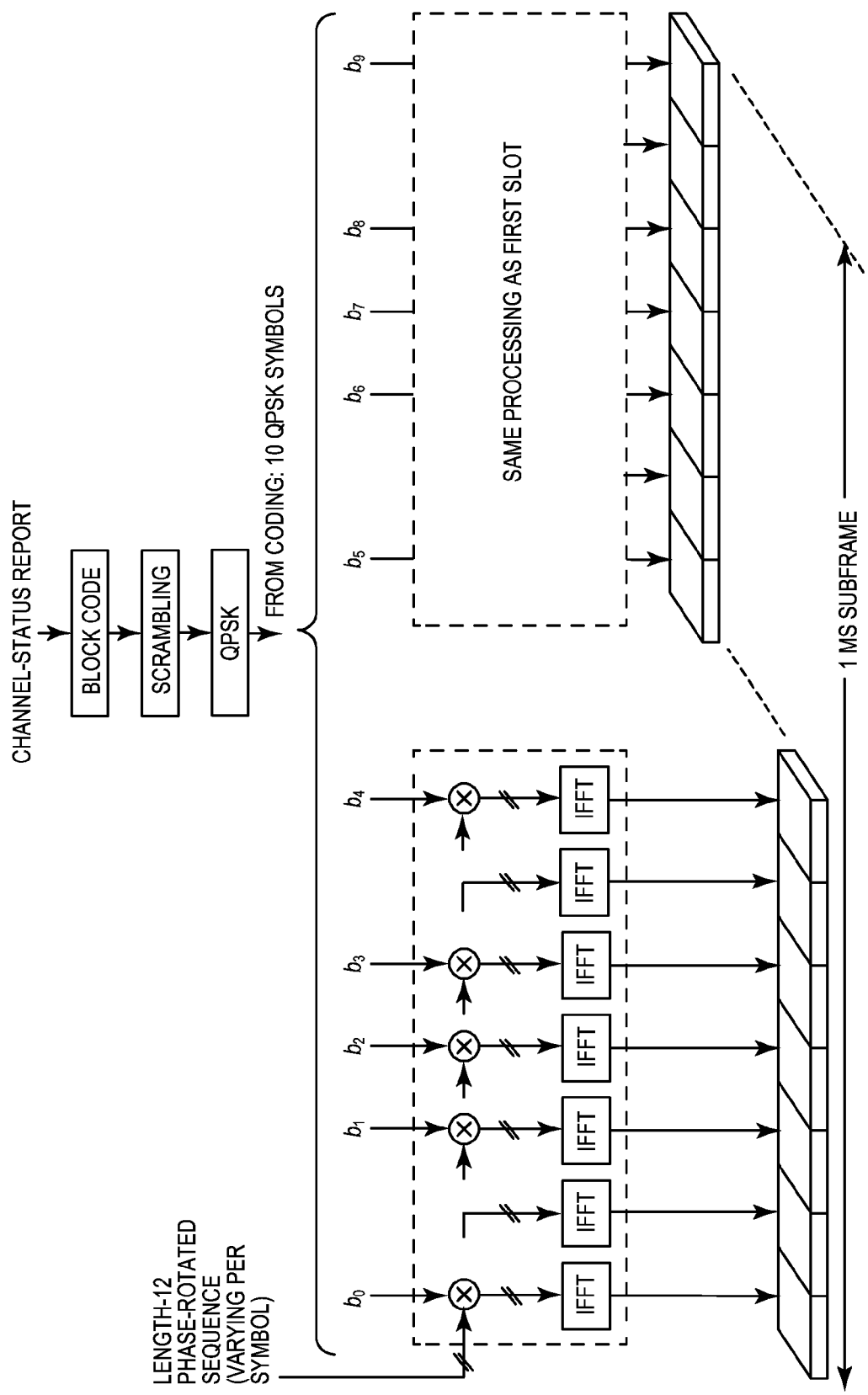
FIG. 6 illustrates the encoding and modulation of channel-status information according to PUCCH Format 2.

PUCCH Format 1/1a/1b transmissions carry only one or two bits of information (plus scheduling requests, depending on the physical control channel resource used for the transmission). Because channel-state information reports require more than two bits of data per subframe, PUCCH Format 2/2a/2b is used for these transmissions. As illustrated in FIG. 6, in PUCCH formats 2, 2a, and 2b, the channel-status reports are first block-coded, and then the block-coded bits for transmission are scrambled and QPSK modulated. (FIG. 6 illustrates coding for a subframe using a normal cyclic prefix, with seven symbols per slot. Slots using extended cyclic prefix have only one reference-signal symbol per slot, instead of two.) The resulting ten QPSK symbols are then multiplied with a cyclically shifted Zadoff-Chu type sequence, a length-12 phase-rotated sequence, where again the cyclic shift varies between symbols and slots. Five of the symbols are processed and transmitted in the first slot, i.e., the slot appearing on the left-hand side of FIG. 6, while the remaining five symbols are transmitted in the second slot. PUCCH formats 2, 2a, and 2b carry two reference symbols per slot, located on SC-FDMA symbol numbers 1 and 5.

For UEs operating in accordance with LTE Release 8 or LTE Release 9 (i.e., without carrier aggregation), it is possible to configure the UE in a mode where it reports ACK/NACK bits and CSI bits simultaneously. If the UE is using normal cyclic prefix, one or two ACK/NACK bits are modulated onto a QPSK symbol on the second reference signal (RS) resource element in each slot of the PUCCH format 2. If one ACK/NACK bit is modulated on the second RS in each slot, the PUCCH format used by the UE is referred to as PUCCH Format 2a. If two ACK/NACK bits are modulated on the second RS in each slot the PUCCH format used by the UE is referred to as PUCCH Format 2b. If the UE is configured with extended cyclic prefix, one or two ACK/NACK bits are jointly coded with channel-state information (CSI) feedback and transmitted together within PUCCH format 2.

As with PUCCH Format 1 transmissions, a pair of resource blocks allocated to PUCCH can carry multiple PUCCH Format 2 transmissions from several UEs, with the separate transmissions separated by the cyclic shifting. As with PUCCH Format 1, each unique PUCCH Format 2 resource can be represented by an index from which the phase rotation and other quantities necessary are derived. The PUCCH format 2 resources are semi-statically configured. It should be noted that a pair of resource blocks can either be configured to support a mix of PUCCH formats 2/2a/2b and 1/1a/1b, or to support formats 2/2a/2b exclusively.

3GPP's Release 10 of the LTE standards (LTE Release 10) has been published and provides support for bandwidths larger than 20 MHz, through the use of carrier aggregation. One important requirement placed on the development of LTE Release 10 specifications was to assure backwards compatibility with LTE Release 8. The need for spectrum compatibility dictated that an LTE Release 10 carrier that is wider than 20 MHz should appear as a number of distinct, smaller bandwidth, LTE carriers to an LTE Release 8 mobile terminal. Each of these distinct carriers can be referred to as a component carrier.

For early LTE Release 10 system deployments in particular, it can be expected that there will be a relatively small number of LTE Release 10-capable mobile terminals, compared to many "legacy" mobile terminals that conform to earlier releases of the LTE specifications. Therefore, it is necessary to ensure the efficient use of wide carriers for legacy mobile terminals as well as Release 10 mobile terminals, i.e., that it is possible to implement carriers where legacy mobile terminals can be scheduled in all parts of the wideband LTE Release 10 carrier.

Figure 7:
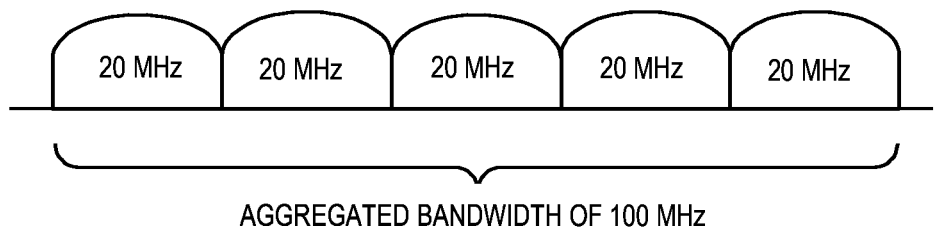
FIG. 7 illustrates the aggregation of several carriers to form an aggregated bandwidth of 100 MHz.

One straightforward way to obtain this is by means of a technique called carrier aggregation. With carrier aggregation, an LTE Release 10 mobile terminal can receive multiple component carriers, where each component carrier has (or at least may have) the same structure as a Release 8 carrier. The basic concept of carrier aggregation is illustrated in FIG. 7, which illustrates the aggregation of five 20-MHz component carriers to yield an aggregated bandwidth of 100 MHz. Release 10 of the LTE standards specifies support of up to five aggregated carriers, where each carrier is limited to one of six radio-frequency (RF) bandwidths, namely 1.4, 3, 5, 10, 15, and 20 MHz.

The number of aggregated component carriers as well as the bandwidth for each individual component carrier may be different for uplink and downlink. In a symmetric configuration, the number of component carriers in downlink and uplink is the same, whereas the numbers of uplink and downlink carriers differ in an asymmetric configuration.

During initial access, an LTE Release 10 mobile terminal behaves similarly to an LTE Release 8 mobile terminal, requesting and obtaining access to a single carrier for the uplink and downlink. Upon successful connection to the network a mobile terminal may—depending on its own capabilities and the network—be configured with additional component carriers in the uplink (UL) and downlink (DL).

Even if a mobile terminal is configured with additional component carriers, it need not necessarily monitor all of them, all of the time. This is because LTE Release 10 supports activation of component carriers, as distinct from configuration. The mobile terminal monitors for PDCCH and PDSCH only component carriers that are both configured and activated. Since activation is based on Medium Access Control (MAC) control elements—which are faster than RRC signaling—the activation/de-activation process can dynamically follow the number of component carriers that is required to fulfill the current data rate needs. All but one component carrier—the downlink Primary component carrier (downlink PCC)—can be deactivated at any given time.

When carrier aggregation is used in LTE, one uplink carrier is designed to carry the HARQ-ACK/NACK bits for all downlink-carrier PDSCH transmissions. To enable the possibility to transmit more than four bits of A/N, PUCCH Format 3 can be used. In FDD scenarios, each downlink carrier can generate one or two HARQ ACK/NACK bits per scheduled subframe, depending on whether multiple-input multiple-output (MIMO) operation is enabled for that carrier. In TDD scenarios, the number of HARQ ACK/NACK bits also depends on how many downlink subframes a given uplink subframe should carry HARQ ACK/NACK bits for.

Figure 8:
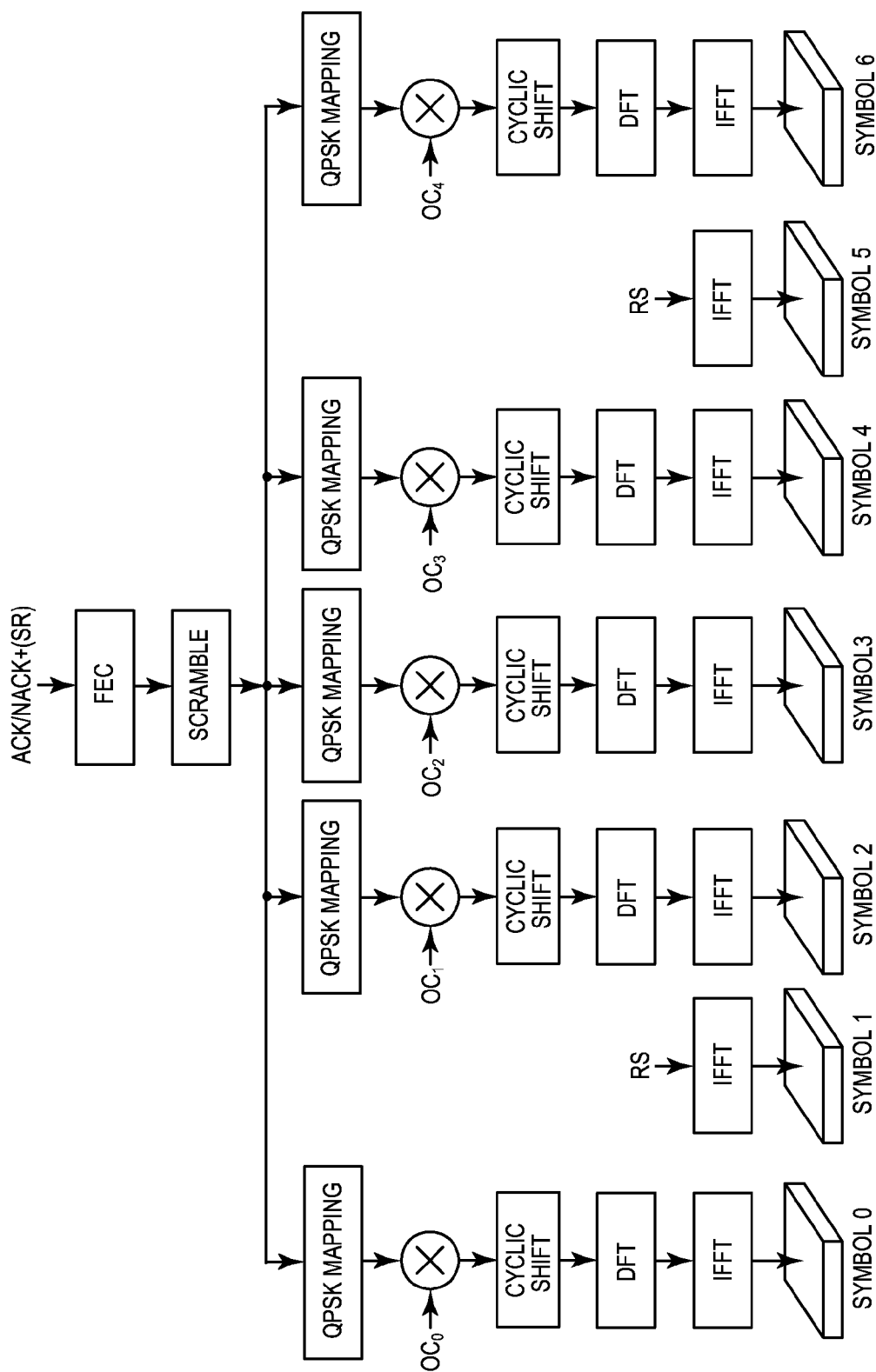
FIG. 8 illustrates the encoding and modulation of multiple ACK/NACK bits according to PUCCH Format 3.

PUCCH Format 3, which is designed for scenarios when more than four bits of information must be transmitted, is based on Discrete Fourier Transform (DFT)-spread OFDM. FIG. 8 shows a block diagram of that design, for one of the two slots of an LTE subframe. The same processing is applied to the second slot of the uplink frame. In the illustrated scenario, multiple ACK/NACK bits (which may be combined with a single scheduling request (SR) bit) are encoded, using a Reed-Muller (RM) forward-error correction (FEC) code, to form 48 coded bits. (Some of the 32 output-coded bits produced by the RM encoder are repeated to produce the 48 coded bits.) The coded bits are then scrambled, using cell-specific (and possibly DFT-spread OFDM symbol dependent) sequences. 24 bits are transmitted within the first slot and the other 24 bits are transmitted within the second slot.

The 24 bits per slot are then mapped into 12 QPSK symbols, as indicated by the blocks labeled "QPSK mapping" in FIG. 8, which appear in five of the OFDM symbols of the slot (symbols 0, 2, 3, 4, and 6). The sequence of symbols in each of these five symbols in the slot is spread with OFDM-symbol-specific orthogonal cover codes, indicated by OC0, OC1, OC2, OC3, and OC4 in FIG. 8, and cyclically shifted, prior to DFT-precoding. The DFT-precoded symbols are converted to OFDM symbols (using an Inverse Fast-Fourier Transform, or IFFT) and transmitted within one resource block (the bandwidth resource) and five DFT-spread OFDM symbols (the time resource). The spreading sequence or orthogonal cover code (OC) is UE-specific and enables multiplexing of up to five users within the same resource blocks.

For the reference signals (RS), cyclic-shifted constant-amplitude zero-autocorrelation (CAZAC) sequences can be used. For example, the computer optimized sequences in 3GPP TS 36.211, "Physical Channels and Modulation," can be used. To improve orthogonality among reference signals even further, an orthogonal cover code of length two could be applied to the reference signals. However, this approach is not used in Releases 10 or 11 of the LTE specifications.

If the number of ACK/NACK bits exceeds eleven, then the bits are split into two parts and two RM encoders are used, one for each of the two parts. This is known as the dual-RM code. Up to twenty ACK/NACK bits (plus one SR bit) can be supported by PUCCH Format 3 in this manner. Each encoder in the dual-RM code outputs twenty-four bits which are converted to twelve QPSK symbols, and the resulting two sets of twelve QPSK symbols are distributed across the slots and interleaved over the subcarriers so that the twelve symbols from the first encoder are mapped to odd subcarriers and the twelve symbols from the second encoder are mapped to even subcarriers, where six odd and six even sub-carriers are assumed per slot. (In this mapping operation, a cell-, slot-, and symbol-specific cyclic shift of the symbols in the time domain is included, to provide inter-cell interference randomization.) The twelve QPSK symbols per slot are then spread across the five DFTS-OFDM symbols, using one out of five orthogonal cover codes, as in the single-RM code case.

Figure 9:
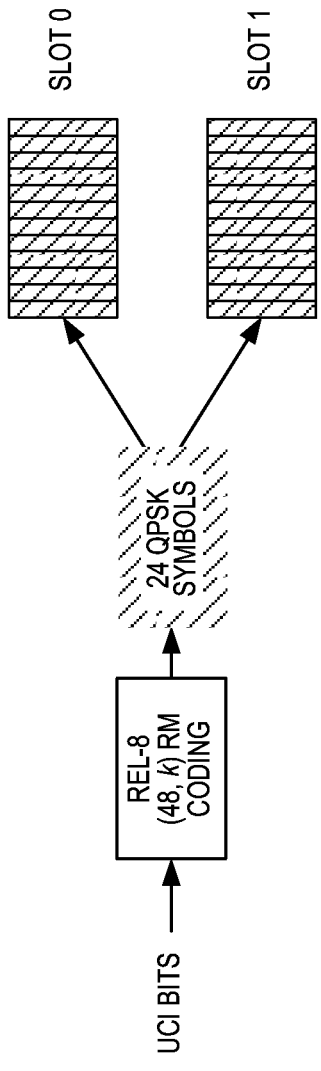
FIG. 9 illustrates details of PUCCH Format 3 encoding and multiplexing for up to 11 bits.
Figure 10:
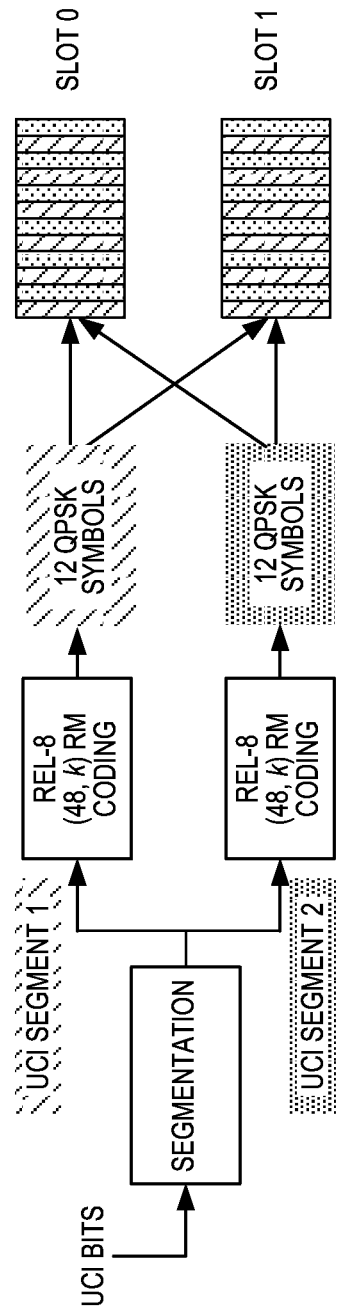
FIG. 10 illustrates details of PUCCH Format 3 encoding and multiplexing for 12-21 bits.

Some details of the encoding and multiplexing approach described above are shown in FIGS. 9 and 10. FIG. 9 illustrates the approach for up to eleven uplink control information (UCI) bits. As described above, in this case the UCI bits are encoded to produce 48 bits, using a single encoder. These 48 bits are mapped to 24 QPSK symbols, which are divided between the first and second slots of the uplink subframe carrying the PUCCH. FIG. 10, on the other hand, illustrates the approach taken for 12 to 21 UCI bits. In this case, the UCI bits are split into two segments, which are supplied to two separate encoders. Each encoder produces 24 encoded bits, which are mapped into twelve QPSK symbols. The 12 QPSK symbols from each encoder are distributed, on an interleaved basis, between the two slots of the uplink subframe.

The operation of the multiplexing scheme illustrated in FIG. 10 is described by the following algorithm, in which $\tilde{b}_0, \tilde{b}_1, \tilde{b}_2, \ldots, \tilde{b}_{23}$ is the output sequence from the first encoder and $\tilde{\tilde{b}}_0, \tilde{\tilde{b}}_1, \tilde{\tilde{b}}_2, \ldots, \tilde{\tilde{b}}_{23}$ the output sequence from the second encoder. $N_{sc}^{RB}=12$ is the number of subcarriers per resource block. The output bit sequence $b_0, b_1, b_2, \ldots, b_{B-1}$, where $B=4 \cdot N_{sc}^{RB}$, is obtained by the alternate concatenation of the bit sequences $\tilde{b}_0, \tilde{b}_1, \tilde{b}_2, \ldots, \tilde{b}_{23}$ and $\tilde{\tilde{b}}_0, \tilde{\tilde{b}}_1, \tilde{\tilde{b}}_2, \ldots, \tilde{\tilde{b}}_{23}$ as shown in the following pseudo-code:

```
Set i, j = 0
while i < 4 · N_sc^RB
    b_i = b̃_j, b_{i+1} = b̃_{j+1}
    b_{i+2} = b̃̃_j, b_{i+3} = b̃̃_{j+1}
    i = i + 4
    j = j + 2
end while.
```

Figure 11:
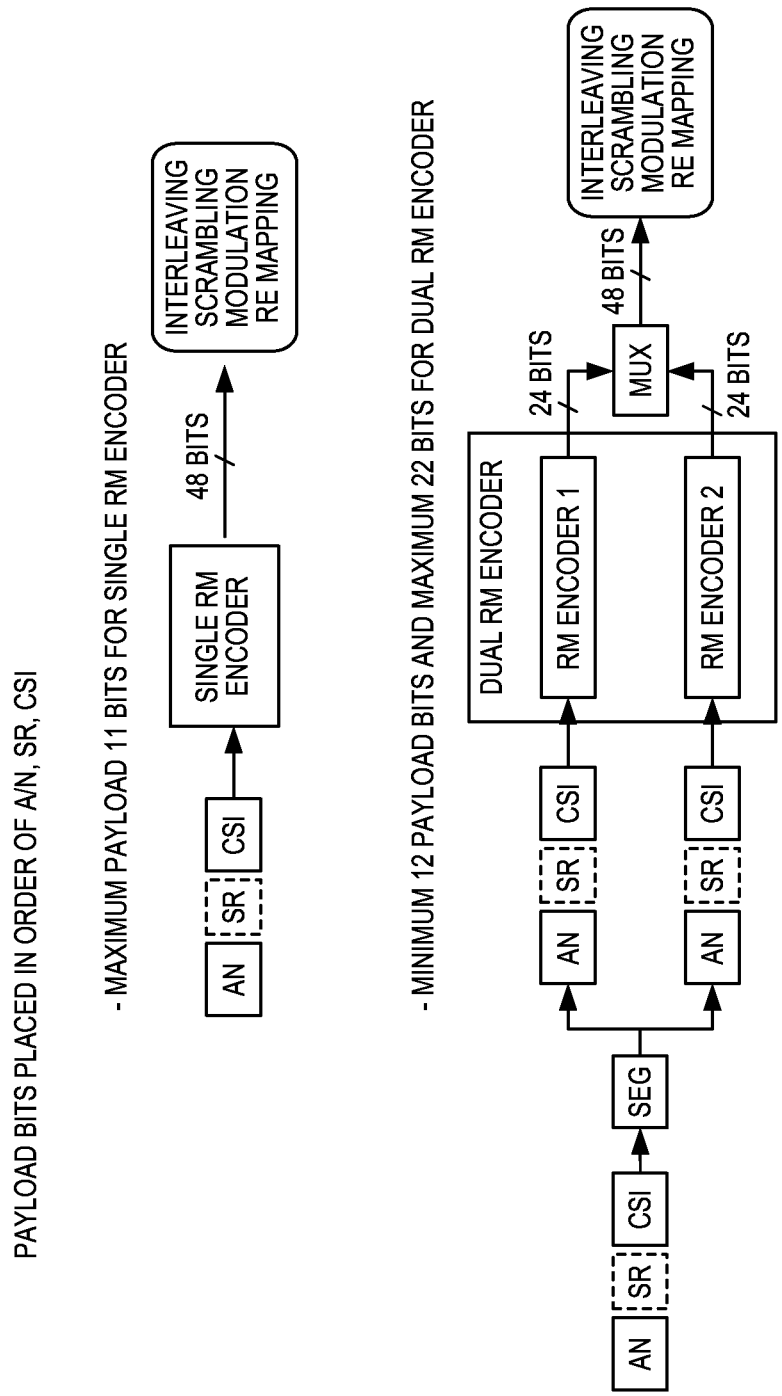
FIG. 11 illustrates joint encoding of ACK/NACK bits and CSI bits.

For Release 11 of the LTE specifications, it has been decided to use the PUCCH Format 3 structure for feedback of the CSI and multi-cell (i.e., multi-carrier) ACK/NACK plus SR. One possible approach for encoding the CSI and ACK/NACK bits is to use a joint encoding approach, in which the CSI, ACK/NACK, and SR bits are concatenated before a single or dual-RM encoder. If the total payload is larger than 11 bits, the dual RM encoder is used, similar to the ACK/NACK case in the Release 10 use of PUCCH Format 3. FIG. 11 illustrates an example for each of these techniques for joint encoding. The top portion of FIG. 11 shows an example approach to encoding of up to 11 payload bits, using a single RM encoder, while the bottom portion illustrates an example approach to encoding between 12 and 22 bits, using a dual RM encoder. In both cases, ACK/NACK bits and CSI bits are jointly encoded.

Another approach under consideration, separate encoding, also uses a dual RM encoder, but the CSI bits are encoded by one encoder and the ACK/NACK bits are encoded by another. When a SR bit is present, it can be encoded together with the ACK/NACK bits. One key advantage of the separate encoding approach, as described in more detail below, is that it can provide different levels of error protection to the CSI and ACK/NACK bits, avoiding over-protection of the ACK/NACK bits and energy waste.

Figure 12:
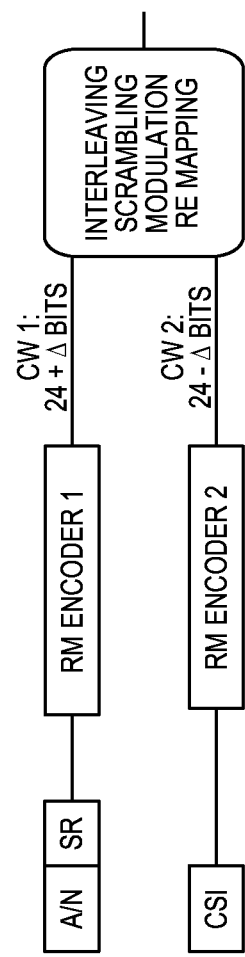
FIG. 12 illustrates separate encoding of ACK/NACK bits and CSI bits.

With this approach, the code rates applied to the CSI bits and ACK/NACK bits, respectively, can be adjusted by a parameter $\Delta$, which is referred to herein as an "encoding-imbalance parameter" or a "rate-matching parameter." The significance of this encoding-imbalance parameter $\Delta$ can be seen in the scenario illustrated in FIG. 12. There it can be seen that the ACK/NACK bits (plus the SR bit, if present) are encoded by a first RM encoder, which produces $24+\Delta$ bits. The CSI bits are encoded a separate RM encoder, which in turn produces $24-\Delta$ bits. Thus, the two encoders together produce 48 bits, regardless of the value of $\Delta$; these 48 bits can then easily be scrambled, modulated, and mapped to the PUCCH Format 3 structure for transmission to the base station.

In general, then, the encoding-imbalance parameter $\Delta$ adjusts the number of output encoded bits from the two encoders while keeping the total number of coded bits unchanged. In some embodiments, the parameter $\Delta$ is restricted to even integer value. With this approach, every two coded bits at the output of each encoder can be easily mapped to a single QPSK symbol.

Referring once again to FIG. 12, it will be appreciated that if $\Delta$ is increased, then RM encoder 1 lowers the code rate while RM encoder 2 increases the code rate, such that the total number of encoded bits remains constant. Hence, an increased $\Delta$ gives better channel coding protection for the bits encoded by RM encoder 1, while reducing protection for the bits encoded by RM encoder 2. Hence, the level of protection for the two payloads can be adjusted, which is useful if the two payloads are different and/or if they have different error requirements. Note that $\Delta$ can be a positive as well as a negative even integer. For a positive $\Delta$, more protection is provided to the HARQ A/N and SR bits, relative to the CSI bits, given the configuration illustrated in FIG. 12. For a negative Δ, more protection is provided to the CSI bits. Each codeword can have the same error protection, i.e., Δ=0, or unequal error protection with Δ≠0.

Scheduling of a component carrier is done using the PDCCH or ePDCCH (extended PDCCH), via downlink assignments. Control information on the PDCCH or ePDCCH is formatted as a Downlink Control Information (DCI) message. In Release 8, where a mobile terminal only operates with one downlink and one uplink component carrier, the association between downlink assignment, uplink grants, and the corresponding downlink and uplink component carriers is very clear. In Release 10, however, two modes of carrier aggregation need to be distinguished. The first mode is very similar to the operation of multiple Release 8 mobile terminals, in that a downlink assignment or uplink grant contained in a DCI message transmitted on a component carrier applies either to the downlink component carrier itself or to a uniquely associated uplink component carrier. (This association may be either via cell-specific or UE-specific linking.) A second mode of operation augments a DCI message with a Carrier Indicator Field (CIF). A DCI containing a downlink assignment with CIF applies to the specific downlink component carrier indicated by the CIF, while a DCI containing an uplink grant with CIF applies to the indicated uplink component carrier.

DCI messages for downlink assignments contain, among other things, resource block assignment, modulation and coding scheme related parameters, and HARQ redundancy version indicators. In addition to those parameters that relate to the actual downlink transmission, most DCI formats for downlink assignments also contain a bit field for Transmit Power Control (TPC) commands. These TPC commands are used to control the uplink power control behavior of the corresponding PUCCH that is used to transmit the HARQ feedback.

Each downlink assignment is scheduled with its own DCI message on the PDCCH. Because Release 8 DCI formats, or formats very similar to Release 8, are used also for Release 10, each received DCI message contains a TPC bit field that contains an adjustment value for the transmit power for PUCCH. Since all TPC commands address the same uplink component carrier and/or PUCCH, it has been proposed to only transmit the true TPC command in one TPC field, and reuse TPC fields in other DCI messages for non-power control related information. Doing this enables higher date rates for non-redundant control information.

The Release 10 specifications for LTE specify the power to be used for transmitting PUCCH as follows:

$$P_{PUCCH}(i) = \min\begin{cases} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i) \end{cases}.$$

The parameters in this formula are given in Table 3. Note that this expression includes an accumulated power adjustment value g(i), which is derived from the TPC commands $\delta_{PUCCH}$(i) sent by the eNodeB to the UE.

TABLE 3

| Power control parameters | |
|---|---|
| $P_{PUCCH}$(i) | PUCCH transmit power for subframe i |
| $P_{CMAX}$ | Configured maximum transmit power for PUCCH CC, e.g. uplink PCC |

TABLE 3-continued

| Power control parameters | |
|---|---|
| $P_{0\_PUCCH}$ | Desired PUCCH receive power signaled by higher layers |
| $h(n_{CQI}, n_{HARQ})$ | Offset parameter that depends on number $n_{CQI}$ of CQI bits or number $n_{HARQ}$ of HARQ bits, to retain the same energy per information bit. |
| $\Delta_{F\_PUCCH}$(F) | Offset parameter that depends on PUCCH format, to give sufficient room for different receiver implementation and radio conditions |
| $\Delta_{TxD}$(F') | Is set determined if the UE is configured with two antenna ports or a single antenna port. If the UE is configured with a single antenna port the parameter corresponds to 0. |
| $g(i) = g(i-1) + \sum_{m=0}^{M-1} \delta_{PUCCH}(i - k_m)$ | Accumulated power adjustment value derived from TPC command $\delta_{PUCCH}$(i). The values M and $k_m$ are depending if the duplexing mode is FDD or TDD. |
| PL | Pathloss |

Generally speaking, the baseline operating point for all PUCCH formats is common, i.e., PUCCH formats 1/1a/1b/2/2a/2b/3 and channel selection all use the same power control loop, with the exception of two power control parameters $h(n_{CQI}, n_{HARQ})$ and $\Delta_{F\_PUCCH}$(F). These parameters take into account different performance and payload sizes for the different PUCCH formats. Therefore, these parameters are individually determined per PUCCH format.

In the discussion that follows, the term $n_{HARQ}$ generally refers to a number of ACK/NACK bits. However, an SR bit, when transmitted can be taken into account in the same manner as ACK/NACK. Thus, $n_{HARQ}$ can also be understood to refer to the number of ACK/NACK bits+SR bit. Furthermore, while $n_{CQI}$ denotes the number of channel-state information (CSI) bits, it should be understood that channel-state information bits can include channel quality indicator (CQI) and/or rank indicator (RI) and/or pre-coding matrix indicator (PMI) bits.

In the event that PUCCH is transmitted together with PUSCH, a power headroom report (PHR) is defined as:

$$PH_{type2}(i) = P_{CMAX,c}(i) -$$

$$10\log_{10}\left(10^{(10\log_{10}(M_{PUSCH,c}(i)) + P_{0\_PUSCH,c}(j) + \alpha_c(j) \cdot PL_c + \Delta_{TF,c}(i) + f_c(i))/10} + 10^{(P_{0\_PUCCH} + PL_c + h(n_{CQI}, n_{HARQ}, n_{SR}) + \Delta_{F\_PUCCH}(F) + \Delta_{TxD}(F') + g(i))/10}\right),$$

where the power control parameters are defined as above and as in 3GPP 36.213, "Physical Layer Procedures," v. 10.4.0 (November 2011), available at www.3gpp.org.

In the Release 10 specifications for LTE, the power control term is defined as follows:

For PUCCH format 1, 1a and 1b, $h(n_{CQI}, n_{HARQ}, n_{SR})$=0.

For PUCCH format 1b with channel selection, if the UE is configured with more than one serving cell, $$h(n_{CQI}, n_{HARQ}, n_{SR}) = \frac{(n_{HARQ} - 1)}{2}, \text{ otherwise, } h(n_{CQI}, n_{HARQ}, n_{SR}) = 0.$$

For PUCCH format 2, 2a, 2b and normal cyclic prefix, $$h(n_{CQI}, n_{HARQ}, n_{SR}) = \begin{cases} 10\log_{10}\left(\frac{n_{CQI}}{4}\right) & \text{if } n_{CQI} \geq 4 \\ 0 & \text{otherwise} \end{cases}$$

For PUCCH format 2 and extended cyclic prefix $$h(n_{CQI}, n_{HARQ}, n_{SR}) = \begin{cases} 10\log_{10}\left(\frac{n_{CQI} + n_{HARQ}}{4}\right) & \text{if } n_{CQI} + n_{HARQ} \geq 4 \\ 0 & \text{otherwise} \end{cases}$$

For PUCCH format 3:
If the UE is configured by higher layers to transmit PUCCH on two antenna ports, or if the UE transmits more than 11 bits of HARQ-ACK/SR, $$h(n_{CQI}, n_{HARQ}, n_{SR}) = \frac{n_{HARQ} + n_{SR} - 1}{3},$$

Otherwise $$h(n_{CQI}, n_{HARQ}, n_{SR}) = \frac{n_{HARQ} + n_{SR} - 1}{2}.$$

For carrier-aggregation PUCCH format 3 there is a need to have a definition of $h(n_{CQI}, n_{HARQ})$ that applies when the UE is configured by higher layers to transmit HARQ-ACK/SR and CSI bits simultaneously. This problem is addressed herein by determining an expression for $h(n_{CQI}, n_{HARQ})$ that is applicable to PUCCH format 3 under these circumstances.

As detailed further below, the best $h(n_{CQI}, n_{HARQ})$ to use for these circumstances is a linear function of $n_{HARQ}$ and $n_{CQI}$ given by:

$$h(n_{CQI}, n_{HARQ}) = a n_{HARQ} + b n_{CQI} + c,$$

where a, b and c are constant values. A UE configured according to the techniques described herein applies the corresponding calculated $h(n_{CQI}, n_{HARQ})$ when setting the transmission power for PUCCH format 3 transmission. Likewise, a UE configured according to these techniques applies the power control term $h(n_{CQI}, n_{HARQ})$ calculated according to this approach when computing PHR.

As discussed above, $h(n_{CQI}, n_{HARQ})$ as defined in 3GPP's Release 10 specifications depends on the number of HARQ-ACK, SR and CSI bits to be transmitted, while the signal-to-noise ratio (SNR) offset due to different radio channels, receiver implementation and PUCCH format is taken care by $\Delta_{F\_PUCCH}(F)$.

To determine $h(n_{CQI}, n_{HARQ})$ and $\Delta_{F\_PUCCH}(F)$, we make the assumption that the eNodeB can correctly control the power of PUCCH format 1a. With that assumption, one approach to obtain $h(n_{CQI}, n_{HARQ})$ is to fit a curve that matches the slope of all different scenarios corresponding to different channel type, velocity, receiver algorithms, bandwidth, etc. These curves can be used to determine $\Delta_{F\_PUCCH}(F)$, in the same process, by calculating the difference between PUCCH format 1a and the corresponding PUCCH format 3 curves for each scenario.

The following explains in more detail how to evaluate the slopes of $h(n_{CQI}, n_{HARQ})$ for each variable, i.e., a or b for $n_{HARQ}$ and $n_{CQI}$, respectively.

Based on extensive evaluations, it has been observed that the power control for PUCCH format 3 transmission of joint CSI, HARQ bits and SR is best based on a linear combination of the number of HARQ-ACK, SR and CSI bits according to below:

$$h(n_{CQI}, n_{HARQ}) = a n_{HARQ} + b n_{CQI} + c. \quad (1)$$

In this equation, the variable $n_{HARQ}$ represents the number of HARQ-bits and scheduling request indication. In other words, the scheduling request bit, i.e., SR bit, and the HARQ bits are considered together in the variable $n_{HARQ}$. Of course, another possible notation is to have a separate variable for SR $n_{SR}$ and a separate notation for $n_{HARQ}$. For the remainder of this discussion, it should be considered that in every occasion where an $n_{HARQ}$ is written, it can be replaced by $n_{HARQ} + n_{SR}$.

The number of hybrid-ARQ ACK/NACK bits that are accounted for in $n_{HARQ}$ can, for example, be one of the following definitions:
(1) the number of transport blocks that are possible to schedule within the HARQ-ACK feedback window;
(2) the number of transport blocks and downlink SPS releases that have been received by the UE within the HARQ-ACK feedback window;
(3) the number of combined HARQ-ACK bits that the UE reports back, based on the configured number of transport blocks per component carrier it aggregates; or
(4) a number of combined HARQ-ACK bits that UE transmits that does not correspond to transport block that was not received by the UE. In this case, if the UE performs spatial bundling between two processes, where one process corresponds to a received transport block and the other process corresponds to a process which did not receive a transport block, it is counted as a single combined HARQ-ACK bit.

In example number 2 above, $n_{HARQ}$ can be described for FDD as:

$$n_{HARQ} = \sum_{c=0}^{N_{cells}^{DL}-1} N_c^{received},$$

where $N_{cells}^{DL}$ is the number of configured cells and $N_c^{received}$ is the number of transport blocks or the SPS release PDCCH, if any, received in subframe in serving cell.

Example number 2 can also be described as the following, for a TDD system:

$$n_{HARQ} = \sum_{c=0}^{N_{cells}^{DL}-1} \sum_{k \in K} N_{k,c}^{received},$$

where $N_{k,c}^{received}$ is the number of transport blocks or the SPS release PDCCH, if any, received in subframe n−k in serving cell c, where k∈K, and M is the number of elements in K defined in Table 1.

Example 4 can further be described, for example, as:

$$n_{HARQ} = \sum_{c=0}^{N_{cells}^{DL}-1} \left( ((V_{DAI,c}^{DL} - U_{DAI,c}) \bmod 4) \cdot n_c^{ACK} + \sum_{k \in K} N_{k,c}^{received} \right),$$

where $V_{DAI,c}^{DL}$ is the $V_{DAI}^{DL}$ in serving cell c, $U_{DAI,c}$ is the $U_{DAI}$ in serving cell c, and $n_c^{ACK}$ is the number of HARQ-ACK bits corresponding to the configured downlink transmission mode on serving cell c. In the event that spatial HARQ-ACK bundling is applied, $n_c^{ACK}=1$ and $N_{k,c}^{received}$ is the number of PDCCH or PDSCH without a corresponding PDCCH received in subframe n−k and serving cell c, where k∈K and M is the number of elements in K. In the event that spatial HARQ-ACK bundling is not applied, $N_{k,c}^{received}$ is the number of transport blocks received or the SPS release PDCCH received in subframe n−k in serving cell c, where k∈K and M is the number of elements in K in Table 1. $V_{DAI,c}^{DL}=0$ if no transport block or SPS release PDCCH is detected in subframe(s) n−k in serving cell c, where k∈K. It is further given that $U_{DAI}$ represent the total number of PDCCH(s) with assigned PDSCH transmission(s) and PDCCH indicating downlink SPS release detected by the UE within the subframe(s) n−k in serving cell c, where k∈K. Further, $V_{DAI}^{DL}$ is the value of the DAI in PDCCH with DCI format detected by the UE, according to Table, in subframe n−$k_m$ in serving cell c, where $k_m$ is the smallest value in the set K according to Table 1, such that the UE detects a DCI format.

Furthermore, the scheduling request bit can indicate either 1 or 0 in according to the following possibilities:

(1) Indicate 1 if subframe i is configured for SR for the UE not having any associated transport block for UL-SCH, otherwise=0.

(2) Indicate 1 if the UE has positive scheduling request for subframe i not having any associated transport block for UL-SCH, otherwise=0.

In equation (1), $n_{CQI}$ represents the number of CSI bits, which can, for example, be the number of PMI, CQI, RI and/or PTI bits. The number of bits can be based on the number of information bits that are reported at the specific occasion. Alternatively, it can be based on a wanted number of report information bits at the specific occasion.

It is further observed that it is possible to re-write equation (1) to eliminate the constant c, so that the effects of the constant c are included in the term $\Delta_{F\_PUCCH}$ (F). Consequently equation (1) can alternatively be expressed as follows:

$$h(n_{CQI}, n_{HARQ}) = an_{HARQ} + bn_{CQI}. \quad (2)$$

As shown above, the power control function can be represented according to either equation (1) or equation (2). To determine a, i.e., the slope corresponding to the number of HARQ-ACK bits and SR bit, the offset due to different scenarios such as the number of CSI bits and/or propagation channel types and/or bandwidths and/or receiver algorithms should be taken away from the corresponding operating SNR values for various number of HARQ-ACK bits and SR bit. Then, a slope which best fits the resultant relative SNR curves versus number of HARQ-ACK bits and SR bit should be used to determine the slope a.

The same procedure as above can be applied to determine the slope b, which corresponds to the number of CSI bits, $n_{CQI}$. However, in this case, the offset due to different scenarios such as number of HARQ-ACK bits and SR bit and/or propagation channel types and/or bandwidths and/or receiver algorithms should be taken away from the corresponding operating SNR values for various number of CSI bits. Then, a slope which best fits the resultant relative SNR curves versus number of CSI bits should be used to determine the slope b.

Other constraints on $h(n_{CQI}, n_{HARQ})$ may be imposed, such as to include a constant value in the $h(n_{CQI}, n_{HARQ})$ expression, which is captured by c. For example, to be consistent with LTE power control specifications, $h(n_{CQI}, n_{HARQ})$ should be such that $h(n_{CQI}=0, n_{HARQ}=1)=0$. This parameter could be included in $h(n_{CQI}, n_{HARQ})$ or can be captured by $\Delta_{F\_PUCCH}$ (F).

Figure 13:
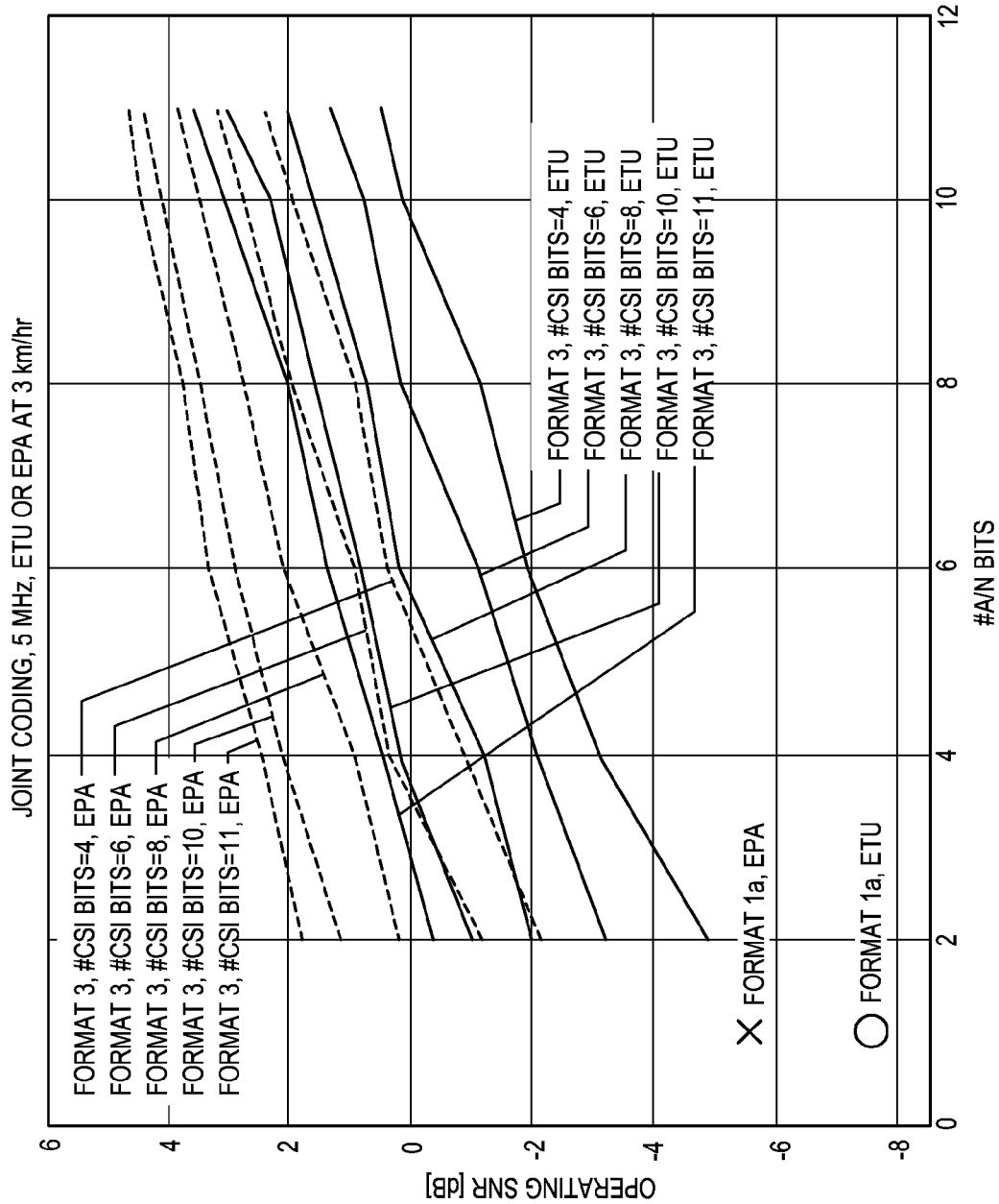
FIGS. 13-18 are graphs illustrating the derivation of parameters for use in calculating a power control parameter.
Figure 14:
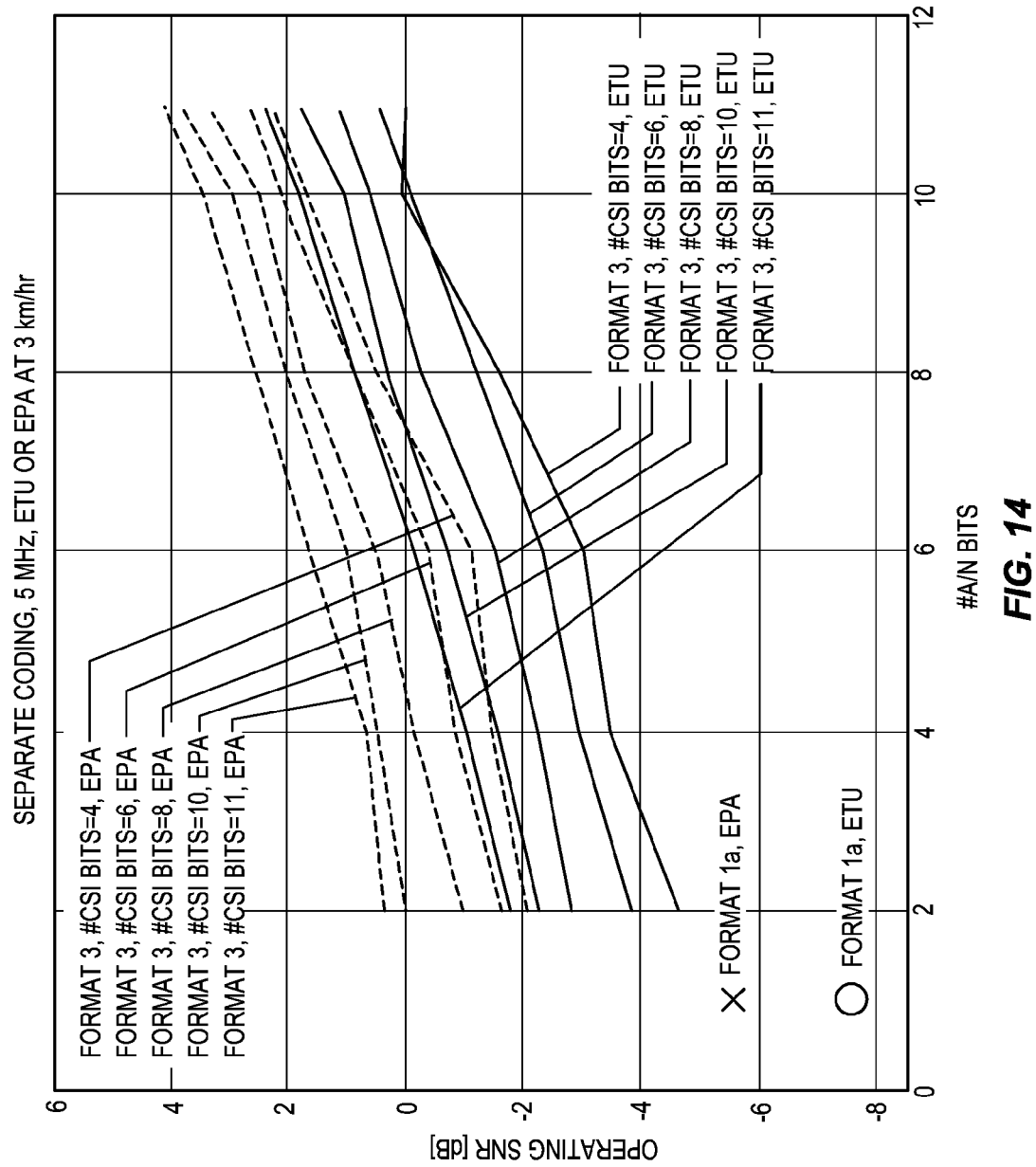

To illustrate the procedure explained above for PUCCH format 3 for simultaneous transmission of HARQ-ACK or/and SR and CSI, consider the following. As mentioned earlier, two main candidates, referred to as joint and separate coding, are proposed for encoding CSI and hybrid-ARQ ACK/NACK bits (and SR). FIGS. 13 and 14 demonstrate the operating SNR in dB versus the number of ACK/NACK bits for several different channel types (including the Extended Typical Urban (ETU) and Extended Pedestrian A (EPA) models) and UE velocities, as well as for different numbers of CSI bits. FIG. 13 illustrates the curves for joint encoding, while FIG. 14 shows the corresponding curves for separate encoding of the CSI and ACK/NACK bits. In both cases, the operating SNR for format 1a is given as well.

Figure 15:
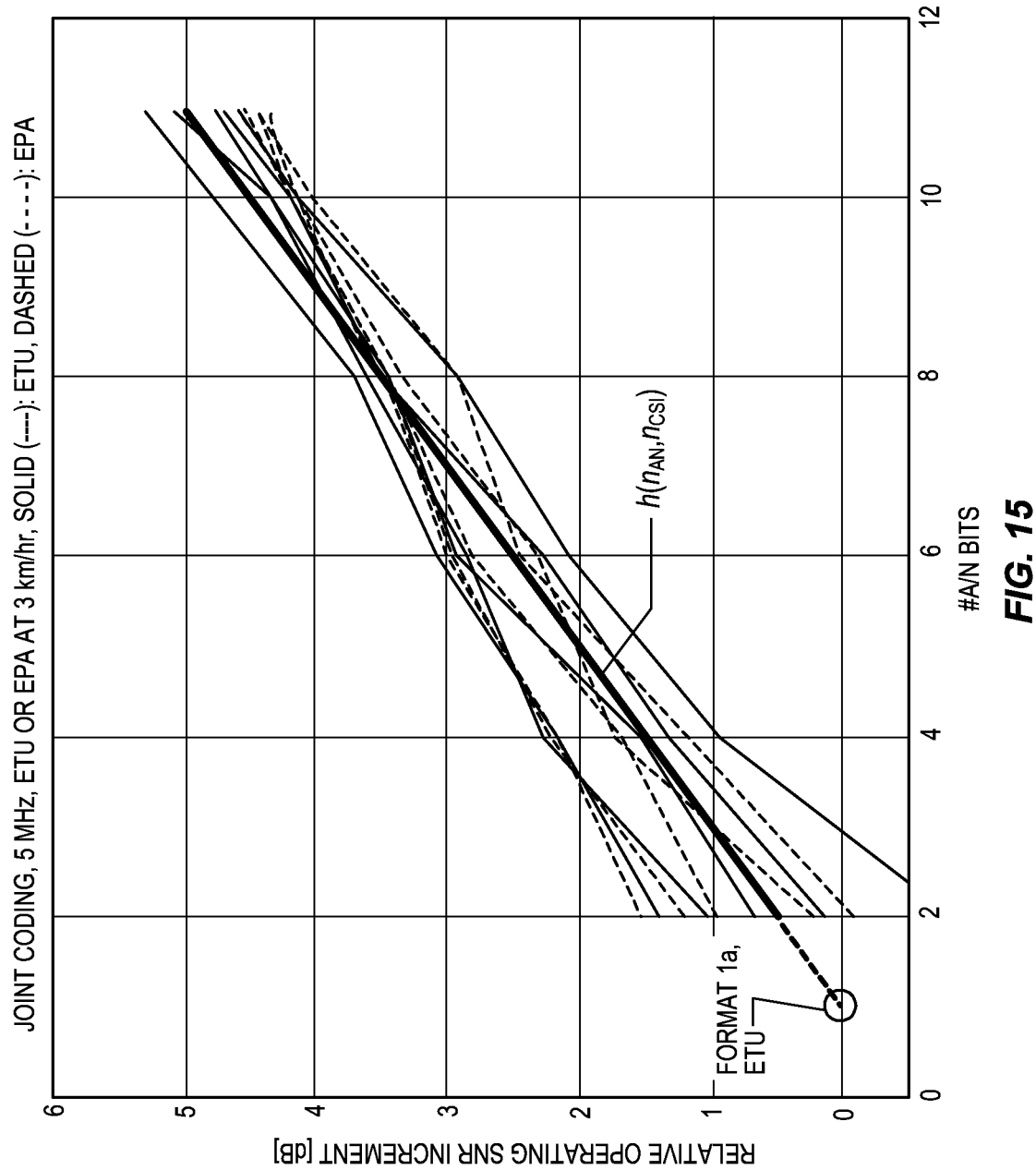
Figure 16:
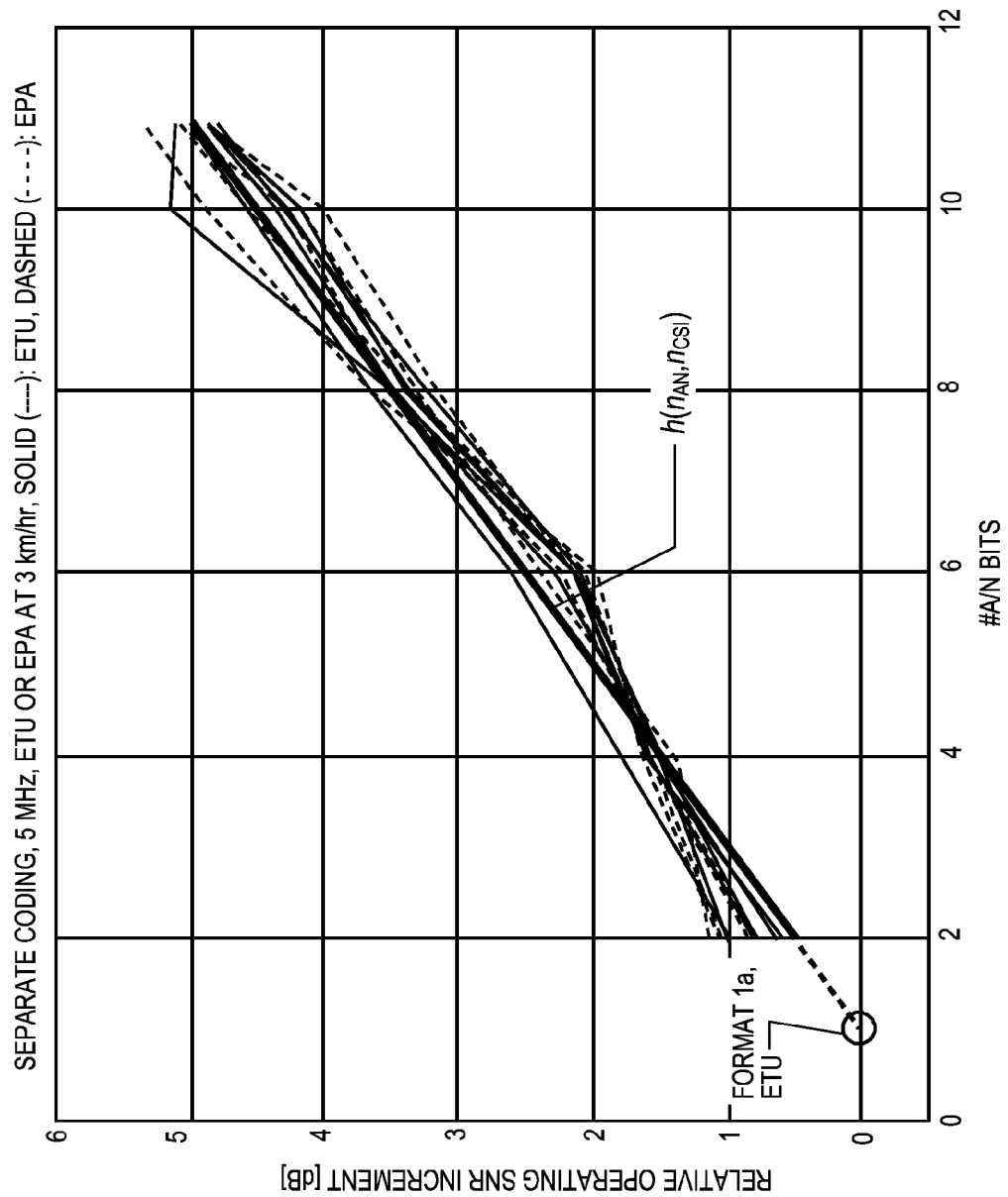
Figure 17:
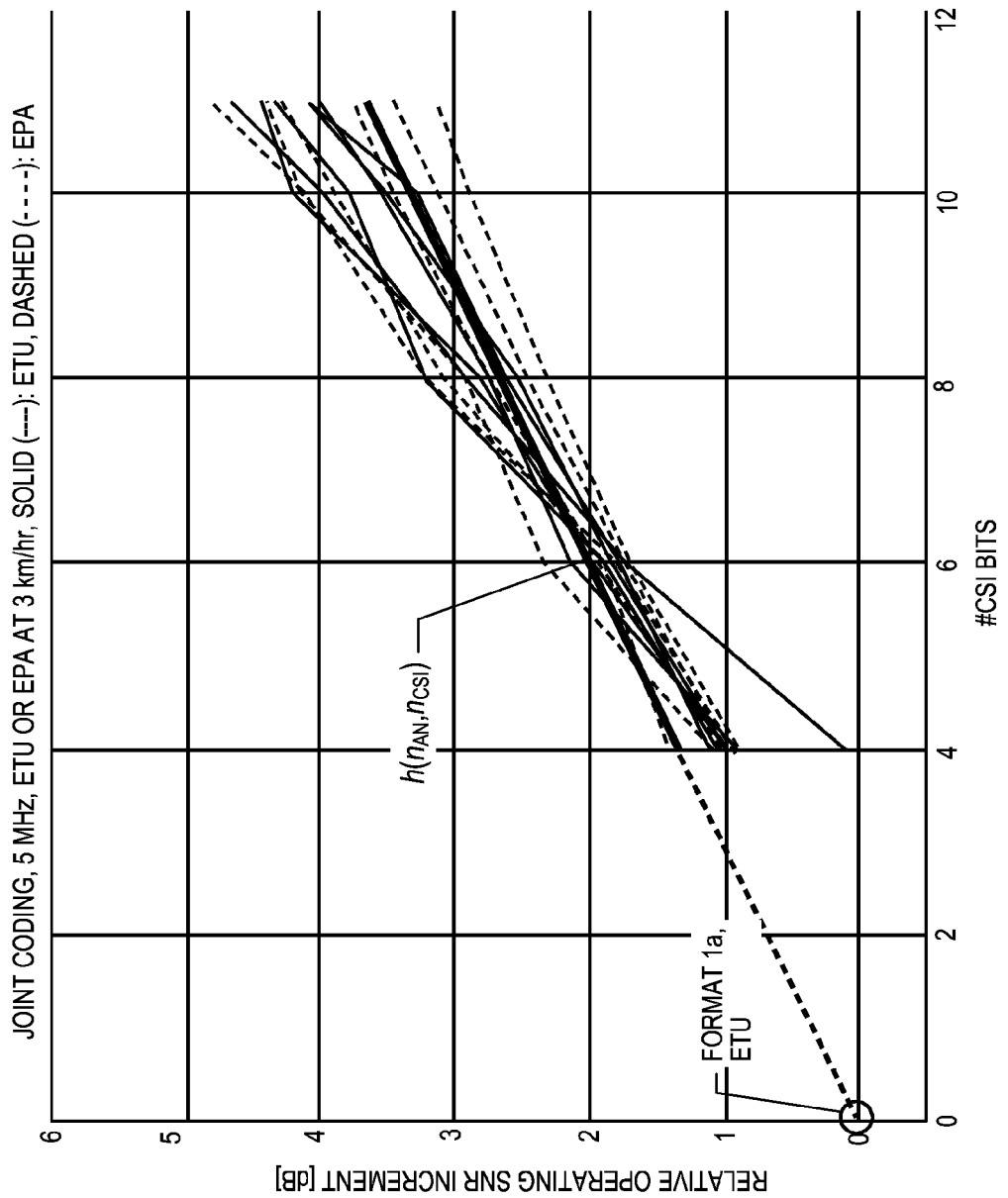
Figure 18:
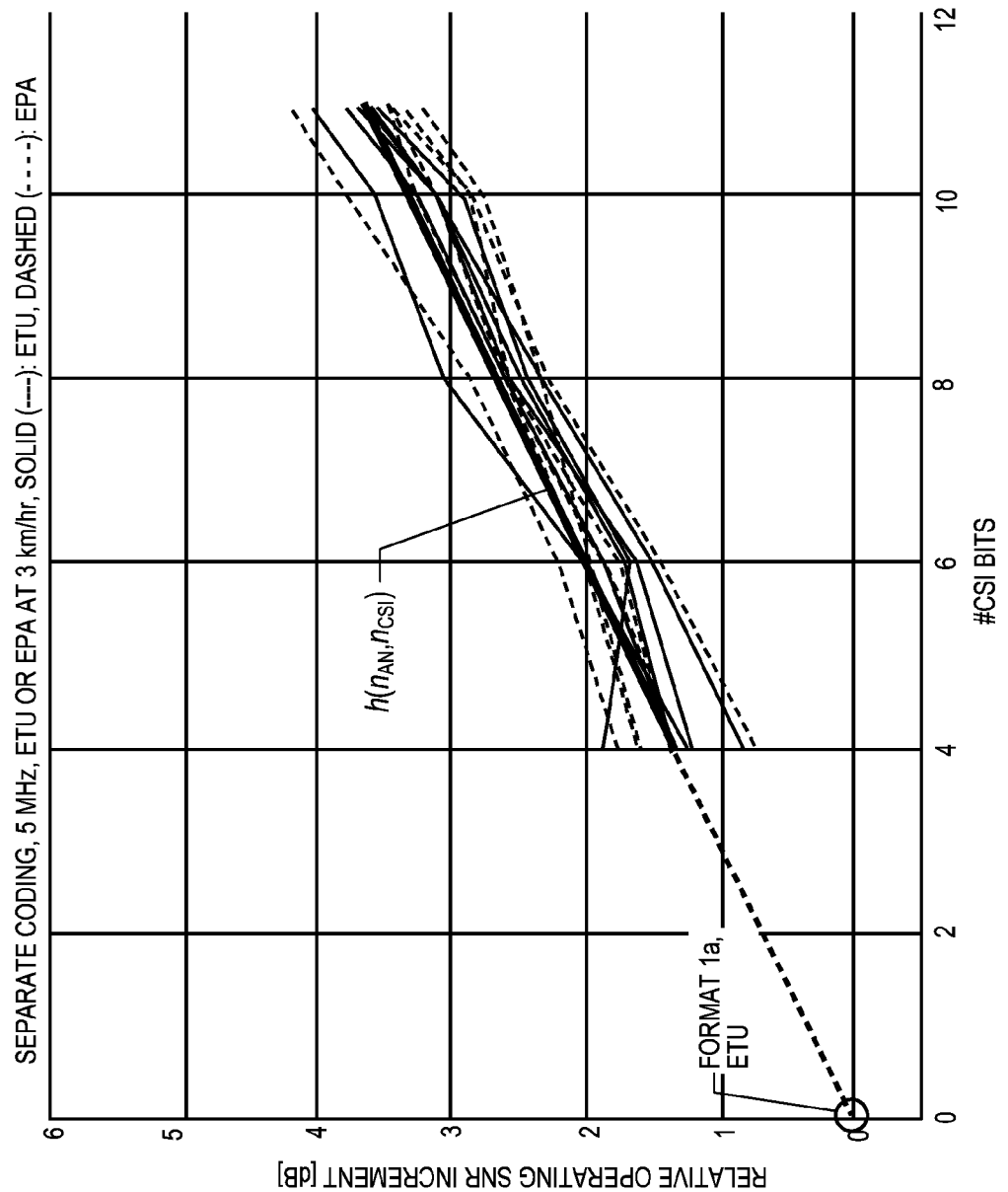

FIGS. 15 and 16 show how the operating SNR curves corresponding respectively to FIGS. 13 and 14 are moved to find a slope with best fit when the number of HARQ-ACK bits and SR bit is varying, thus yield relative operating SNR curves. Similar methodology is applied to determine the best slope when the number of CSI bits is varying, as shown in FIGS. 17 and 18 for joint and separate coding respectively.

As a result, the best fit is found to be a=½ and b=⅓. Moreover, c=−½ fulfills the requirement $h(n_{CQI}=0, n_{HARQ}=1)=0$, which could alternatively be captured by $\Delta_{F\_PUCCH}(F)$.

This means that for simultaneous transmission of HARQ-ACK, SR and CSI bits, irrespective of the encoding scheme, the best expression for $h(n_{CQI}, n_{HARQ})$ is given by $$h(n_{CQI}, n_{HARQ}) = \frac{n_{HARQ}-1}{2} + \frac{n_{CQI}}{3}.$$

Hence, it is given that $\Delta_{F\_PUCCH}(F)=0$ or alternatively can be $\Delta_{F\_PUCCH}(F)=0.5$. Other values for $\Delta_{F\_PUCCH}(F)$ are also possible, considering implementation margin for UE and eNB.

In FIGS. 13 to 18, the number of A/N bits represents the number of HARQ-ACK bits and/or SR bit.

In several embodiments, the UE will apply the corresponding $h(n_{CQI}, n_{HARQ})$ and $\Delta_{F\_PUCCH}(F)$ described above in setting the UEs transmission power. In some of these and in some other embodiments, the UE will apply the corresponding $h(n_{CQI}, n_{HARQ})$ and $\Delta_{F\_PUCCH}(F)$ described above when determining a power headroom report including a PUCCH report.

Likewise, in some embodiments an eNodeB power controls the PUCCH of a UE assuming that the UE will adapts its transmission power according to one of the formulations described above. In some of these and in some other embodiments, the eNodeB receives a PHR calculated based on the formulations discussed above. In a further sub-embodiment, the eNodeB utilizes the PHR report for uplink scheduling, for example for link adaption of PUSCH, SRS and/or PUCCH transmissions.

Figure 19:
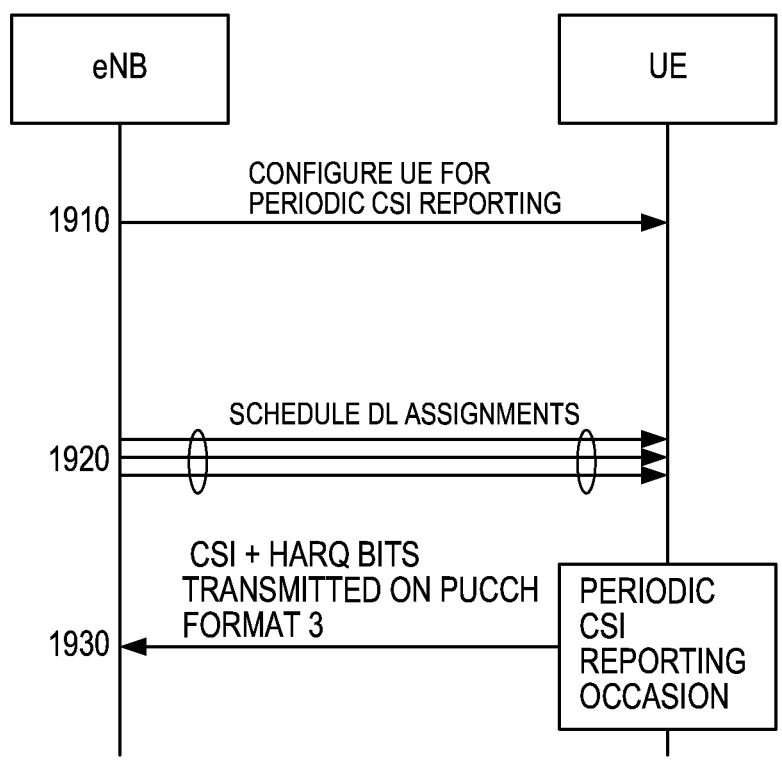
FIG. 19 is a process flow diagram describing joint reporting of CSI and hybrid-ARQ ACK/NACK bits.

FIG. 19 is a signal flow diagram illustrating joint reporting of CSI and hybrid-ARQ ACK/NACK bits at the system level, i.e., between a UE and eNodeB. As shown at 1910, the signaling flow begins with the eNodeB configuring the UE for periodic CSI reporting. Subsequently, as shown at 1920, the eNodeB schedules downlink transmissions, and transmits the downlink assignments to the UE. At each periodic CSI reporting occasion, the UE simultaneously transmits CSI bits and ACK/NACK bits (plus an SR bit). One of these occasions is shown at 1930.

Figure 20:
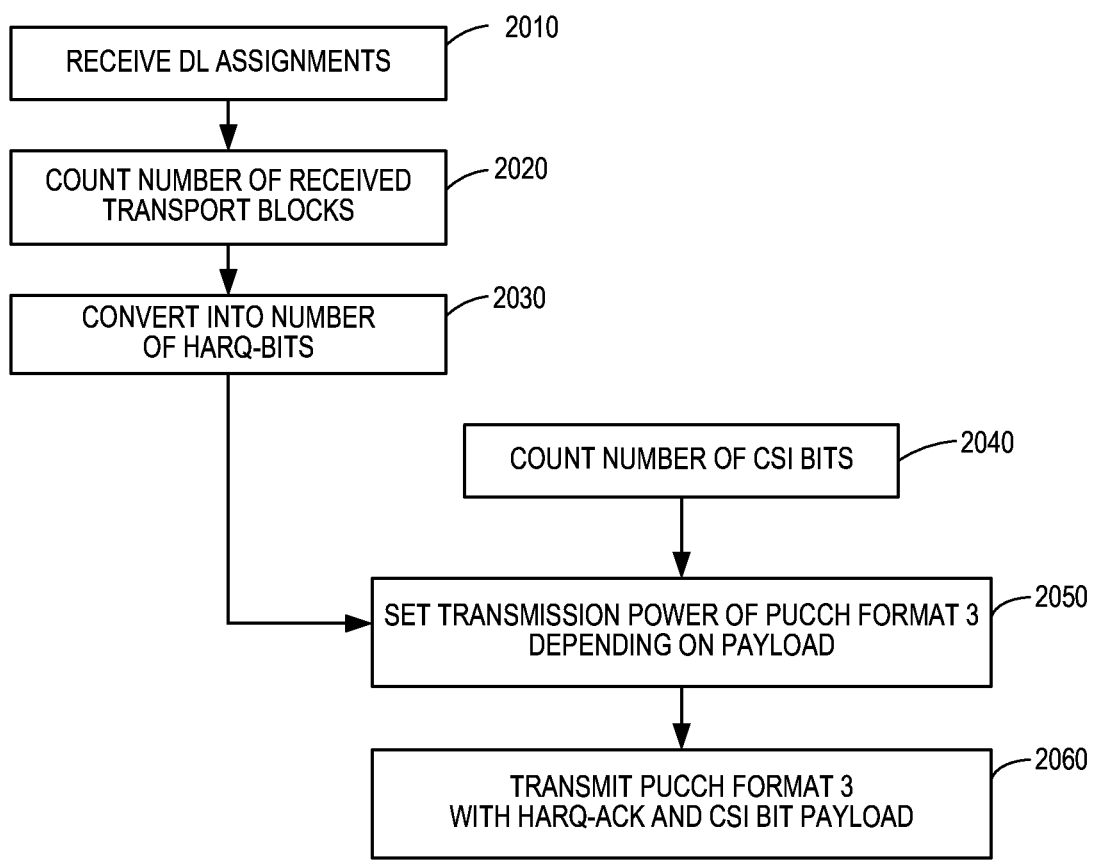
FIG. 20 illustrates a UE procedure to set the output power of a PUCCH format 3 transmission.

FIG. 20 illustrates a UE procedure to set the output power of a PUCCH format 3 transmission according to embodiments of the presently disclosed techniques. As seen at block 2010, the UE receives one or more downlink assignments. (Note that this corresponds to the signaling shown at 1920 in FIG. 19.) Based on the downlink assignments, the UE can count the number of received transport blocks, as shown at block 2020. This determines the number of HARQ ACK/NACK bits, as shown at block 2030. The UE also determines a number of CSI bits that need to be transmitted, as shown at block 2040. Then, as shown at block 2050, the UE determines and sets a transmission power of a PUCCH format 3 transmission, based on the payload of CSI and ACK/NACK bits. Finally, the UE transmits PUCCH format 3, carrying encoded CSI and ACK/NACK bits, as shown at block 2050.

Figure 21:
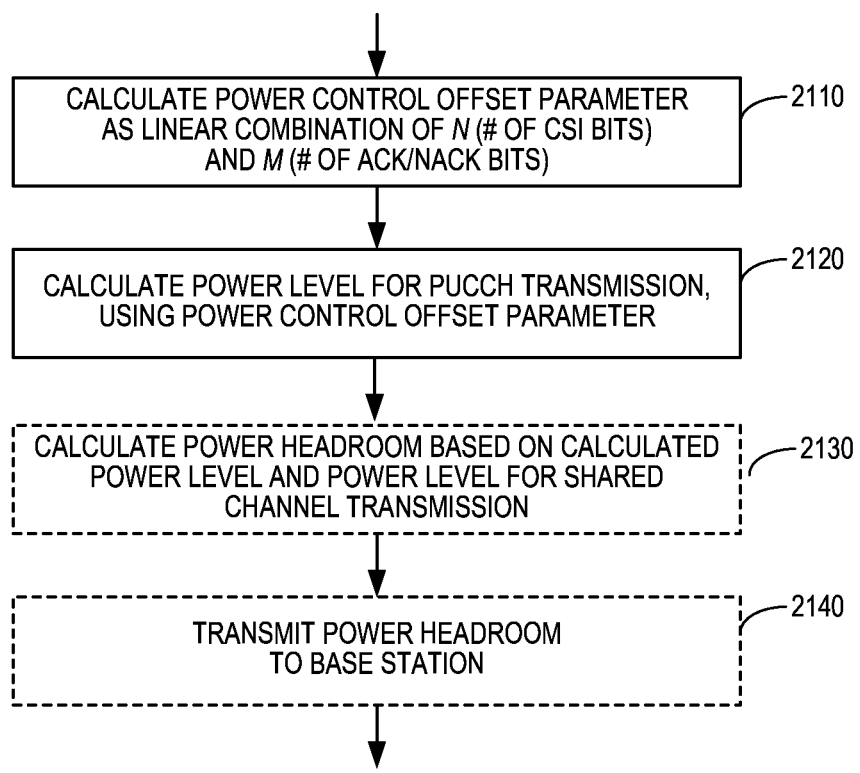
FIG. 21 is a process flow diagram illustrating an example method for simultaneous reporting of channel-state information bits and hybrid-ARQ ACK/NACK bits for multiple downlink subframes or multiple downlink carriers, or both.

The process flow diagram in FIG. 21 illustrates details of how the power level for the PUCCH format 3 is carried out. It will be appreciated, then, that the process illustrated in FIG. 21 may be a subset of the operations carried out in the operation illustrated at block 2050 of FIG. 20.

Referring to FIG. 21, the illustrated process begins, as shown at block 2110, with calculating a power control offset parameter as a linear combination of at least a number N, representing a number of channel-state information bits and a number M, representing a number of hybrid-ARQ ACK/NACK bits. Next, as shown at block 2120, the UE calculates a power level for a transmission on a physical uplink control channel (PUCCH), using the power control offset parameter. As was illustrated at block 2060 of FIG. 20, the UE may then transmit encoded channel-state information and hybrid-ARQ ACK/NACK bits according to the calculated power level.

In some embodiments of the process illustrated in FIG. 21, the linear combination referred to above is of the form aN+bM+c, where a, b, and c are non-zero constants. In some of these and in some other embodiments, the number M may represent the number of hybrid-ARQ ACK/NACK bits and a scheduling request (SR) bit.

In some embodiments, the process continues with the calculation of a power headroom parameter based on the calculated power level and based on a calculated power level for shared channel transmission. The power headroom parameter may then be transmitted to a base station. These operations are shown at block 2130 and 2140 of FIG. 21. Note, however, that these blocks are represented with a dashed outline, indicating that these operations are "optional," in the sense that they may not appear in every embodiment or in every scenario.

The functions in the block diagrams and process flow diagrams discussed above may be implemented using electronic data processing circuitry provided in the mobile terminal and in a base station. Each mobile terminal and base station, of course, also includes suitable radio circuitry for receiving and transmitting radio signals formatted in accordance with known formats and protocols, e.g., LTE formats and protocols.

Figure 22:
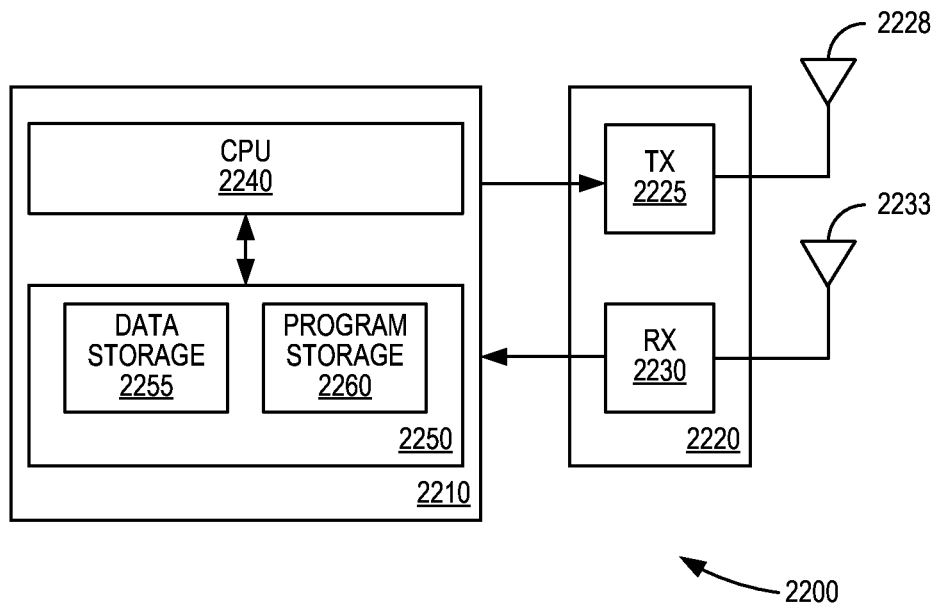
FIG. 22 is a block diagram illustrating components of an example communications node.

FIG. 22 illustrates features of an example communications node 2200 embodying the techniques described above. Although the detailed configuration, as well as features such as physical size, power requirements, etc., will vary, the general characteristics of the elements of communications node 2200 are common to both a wireless base station and a mobile terminal. Further, both may be adapted to carry out one or several of the techniques described above for encoding and transmitting ACK/NACK bits and channel-state information or decoding such information from a received signal.

Communications node 2200 comprises a transceiver 2220 for communicating with mobile terminals (in the case of a base station) or with one or more base stations (in the case of a mobile terminal) as well as a processing circuit 2210 for processing the signals transmitted and received by the transceiver 2220. Transceiver 2220 includes a transmitter 2225 coupled to one or more transmit antennas 2228 and receiver 2230 coupled to one or more receive antennas 2233. The same antenna(s) 2228 and 2233 may be used for both transmission and reception. Receiver 2230 and transmitter 2225 use known radio processing and signal processing components and techniques, typically according to a particular telecommunications standard such as the 3GPP standards for LTE and/or LTE-Advanced. Because the various details and engineering tradeoffs associated with the design and implementation of such circuitry are well known and are unnecessary to a full understanding of the techniques described herein, additional details are not shown here.

Processing circuit 2210 comprises one or more processors 2240, hardware, firmware or a combination thereof, coupled to one or more memory devices 2250 that make up a data storage memory 2255 and a program storage memory 2260. Memory 2250 may comprise one or several types of memory such as read-only memory (ROM), random-access memory, cache memory, flash memory devices, optical storage devices, etc. Again, because the various details and engineering tradeoffs associated with the design of baseband processing circuitry for mobile devices and wireless base stations are well known and are unnecessary to a full understanding of the techniques described herein, additional details are not shown here.

Typical functions of the processing circuit 2210 include modulation and coding of transmitted signals and the demodulation and decoding of received signals. In several embodiments, processing circuit 2210 is adapted, using suitable program code stored in program storage memory 2260, for example, to carry out one of the techniques described above for encoding and transmitting ACK/NACK bits and channel-state information or decoding such information from a received signal. More particularly, the processing circuit in some embodiments is adapted to calculate a power control offset parameter as a linear combination of at least a number N, representing a number of channel-state information bits and a number M, representing a number of hybrid-ARQ ACK/NACK bits, and to calculate a power level for a transmission on a physical uplink control channel (PUCCH), using the power control offset parameter. In some embodiments, the processing circuit 2210 is further adapted to calculate a power headroom parameter based on the calculated power level and based on a calculated power level for shared channel transmission. The power headroom parameter may then be transmitted to a base station. Of course, it will be appreciated that not all of the steps of these techniques are necessarily performed in a single microprocessor or even in a single module.

Figure 23:
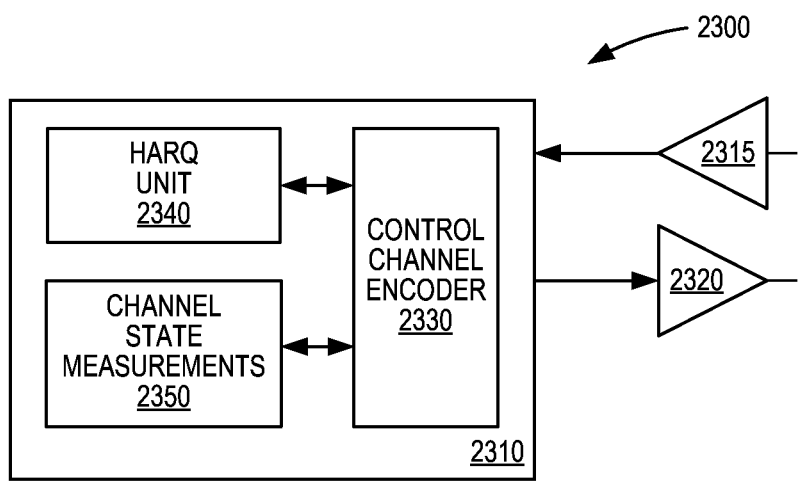
FIG. 23 illustrates functional components of an example mobile terminal.

FIG. 23 illustrates several functional elements of a mobile terminal 2300, adapted to carry out some of the techniques discussed in detail above. Mobile terminal 2300 includes a processing circuit 2310 configured to receive data from a base station, via receiver circuit 2315, and to construct a series of uplink subframes for transmission by transmitter circuit 2320. In several embodiments, processing circuit 2310, which may be constructed in the manner described for the processing circuits 2210 of FIG. 23, includes a hybrid-ARQ processing unit 2340, which is adapted to determine that first channel-state information (from channel-state measurement unit 2350) and first hybrid-ARQ ACK/NACK bits corresponding to a plurality of downlink subframes or a plurality of downlink carriers, or both, are scheduled for transmission in an uplink subframe. Processing circuit 2310 further includes an uplink control channel encoding unit 2330. This unit, which may be at least partly configured according to the block diagram of FIG. 8, for example, is adapted to encode the hybrid-ARQ ACK/NACK bits and the channel-state information, using joint or separate encoders, to interleave the encoded hybrid-ARQ ACK/NACK bits and the encoded channel-state information bits, and to send both the first channel-state information and the first hybrid-ARQ ACK/NACK bits in physical control channel resources of the first uplink subframe, on a single carrier. Of course, all of the variants of the techniques described above are equally applicable to mobile terminal 2300 as well.

It will be appreciated by the person of skill in the art that various modifications may be made to the above described embodiments without departing from the scope of the presently described techniques. For example, it will be readily appreciated that although the above embodiments are described with reference to parts of a 3GPP network, other embodiments will also be applicable to like networks, such as a successor of the 3GPP network, having like functional components. Therefore, in particular, the terms 3GPP and associated or related terms used in the above description and in the enclosed drawings and any appended claims now or in the future are to be interpreted accordingly.

Examples of several embodiments have been described in detail above, with reference to the attached illustrations of specific embodiments. Because it is not possible, of course, to describe every conceivable combination of components or techniques, those skilled in the art will appreciate that the techniques described above can be implemented in other ways than those specifically set forth herein, without departing from essential characteristics of the techniques. The present embodiments are thus to be considered in all respects as illustrative and not restrictive.

What is claimed is:

1. A method in a mobile terminal configured for simultaneous reporting of channel-state information bits and hybrid-ARQ ACK/NACK bits for multiple downlink subframes or multiple downlink carriers, or both, the method comprising, for each of a first plurality of reporting instances:

calculating a power control offset parameter as a linear combination of at least a number N, representing a number of channel-state information bits, and a number M, representing a number of hybrid-ARQ ACK/NACK bits; and calculating a power level for a transmission on a physical uplink control channel (PUCCH), using the power control offset parameter; and transmitting encoded channel-state information and hybrid-ARQ ACK/NACK bits according to the calculated power level.

2. The method of claim 1, wherein said linear combination is of the form aN+bM+c, where a, b, and c are non-zero constants.

3. The method of claim 1, further comprising calculating a power headroom parameter based on the calculated power level and based on a calculated power level for shared channel transmission.

4. The method of claim 3, further comprising transmitting the power headroom parameter to a base station.

5. The method of claim 1, wherein the number M represents the number of hybrid-ARQ ACK/NACK bits and a scheduling request (SR) bit.

6. A mobile terminal configured to simultaneously report channel-state information bits and hybrid-ARQ ACK/NACK bits for multiple downlink subframes or multiple downlink carriers, or both, the mobile terminal comprising a receiver circuit, a transmitter circuit, and a processing circuit, wherein the processing circuit is adapted to, for each of a first plurality of reporting instances:

calculate a power control offset parameter as a linear combination of at least a number N,
        representing a number of channel-state information bits, and a number M,
        representing a number of hybrid-ARQ ACK/NACK bits; and calculate a power level for a transmission on a physical uplink control channel (PUCCH), using the power control offset parameter; and control the transmitter circuit to transmit the encoded channel-state information and hybrid-ARQ ACK/NACK bits according to the calculated power level.

7. The mobile terminal of claim 6, wherein said linear combination is of the form aN+bM+c, where a, b, and c are non-zero constants.

8. The mobile terminal of claim 6, wherein the processing circuit is further adapted to calculate a power headroom parameter based on the calculated power level
    and based on a calculated power level for shared channel transmission.

9. The mobile terminal of claim 8, wherein the processing circuit is further adapted to, for each of the plurality of reporting instances, control the transmitter circuit to transmit the power headroom parameter to a base station.

10. The mobile terminal of claim 6, wherein the number M represents the number of hybrid-ARQ ACK/NACK bits and a scheduling request (SR) bit.

* * * * *

UNITED STATES PATENT AND TRADEMARK OFFICE
CERTIFICATE OF CORRECTION

PATENT NO. : 9,054,846 B2
APPLICATION NO. : 13/814953
DATED : June 9, 2015
INVENTOR(S) : Falahati et al.

It is certified that error appears in the above-identified patent and that said Letters Patent is hereby corrected as shown below:

IN THE SPECIFICATION

In Column 11, Line 63, delete " $\tilde{b}_0, \tilde{b}_1, \tilde{b}_2, \ldots, \hat{\tilde{b}}_{B-1},$ " and insert -- $b_0, b_1, b_2, \ldots, b_{B-1}$, --, therefor.

Signed and Sealed this
Seventeenth Day of November, 2015

Michelle K. Lee
*Director of the United States Patent and Trademark Office*